United States Patent
Nadj et al.

(10) Patent No.: US 9,418,093 B2
(45) Date of Patent: Aug. 16, 2016

(54) SYSTEM AND METHOD FOR SCHEDULING AND ARBITRATING EVENTS IN COMPUTING AND NETWORKING

(75) Inventors: Paul Nadj, Ottawa (CA); David Walter Carr, Nepean (CA); Edward D. Funnekotter, Ottawa (CA)

(73) Assignee: Altera Corporation, San Jose, CA (US)

( * ) Notice: Subject to any disclaimer, the term of this patent is extended or adjusted under 35 U.S.C. 154(b) by 103 days.

(21) Appl. No.: 13/230,732

(22) Filed: Sep. 12, 2011

(65) Prior Publication Data
US 2014/0181126 A1    Jun. 26, 2014

Related U.S. Application Data

(62) Division of application No. 09/931,841, filed on Aug. 16, 2001, now Pat. No. 8,032,561.

(51) Int. Cl.
*G06F 17/00* (2006.01)
*G06F 17/30* (2006.01)
*G06F 7/22* (2006.01)
*G06F 7/24* (2006.01)

(52) U.S. Cl.
CPC ............ *G06F 17/30336* (2013.01); *G06F 7/22* (2013.01); *G06F 7/24* (2013.01); *G06F 17/30327* (2013.01); *G06F 2207/222* (2013.01); *Y10S 707/99942* (2013.01)

(58) Field of Classification Search
CPC ................... Y10S 707/99942; G06F 17/30327
USPC ..................... 707/799, 797; 711/104; 709/223
See application file for complete search history.

(56) References Cited

U.S. PATENT DOCUMENTS

| | | | | |
|---|---|---|---|---|
| 5,771,374 A | * | 6/1998 | Burshtein et al. | 713/502 |
| 5,850,538 A | * | 12/1998 | Steinman | 703/21 |
| 6,128,672 A | * | 10/2000 | Lindsley | G06F 9/4843 710/15 |
| 6,748,451 B2 | * | 6/2004 | Woods | G04G 15/006 709/248 |
| 7,817,544 B2 | * | 10/2010 | Zhu | G06F 9/5083 370/230.1 |

* cited by examiner

*Primary Examiner* — Marc Filipczyk
(74) *Attorney, Agent, or Firm* — Okamoto & Benedicto LLP

(57) ABSTRACT

A method for high-speed scheduling and arbitration of events for computing and networking is disclosed. The method includes the software and hardware implementation of a unique data structure, known as a pile, for scheduling and arbitration of events. According to the method, events are stored in loosely sorted order in piles, with the next event to be processed residing in the root node of the pile. The pipelining of the insertion and removal of events from the piles allows for simultaneous event removal and next event calculation. The method's inherent parallelisms thus allow for the automatic rescheduling of removed events for re-execution at a future time, also known as event swapping. The method executes in O(1) time.

14 Claims, 21 Drawing Sheets

160

|  | time ---------------> | | | | | | | | | | | | | | | | | |
| --- | --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 | 16 | 17 | 18 |
| Read Level 1 RAM | A |  |  |  |  |  | B |  |  |  |  |  |  |  |  |  |  |  |
| Write Level 1 RAM |  |  |  |  | A |  |  |  |  |  |  | B |  |  |  |  |  |  |
| Level A Comparisons |  |  | A | A |  |  |  |  |  | B | B |  |  |  |  |  |  |  |
| Read Level 2 RAM |  | A |  |  |  |  |  | B |  |  |  |  |  |  |  |  |  |  |
| Write Level 2 RAM |  |  |  |  |  |  | A |  |  |  |  |  | B |  |  |  |  |  |
| Level B Comparisons |  |  |  |  | A | A |  |  |  |  | B | B |  |  |  |  |  |  |
| Read Level 3 RAM |  |  |  | A |  |  |  |  | B |  |  |  |  |  |  |  |  |  |
| Write Level 3 RAM |  |  |  |  |  |  |  | A |  |  |  |  |  | B |  |  |  |  |
| Level C Comparisons |  |  |  |  |  | A | A |  |  |  |  | B | B |  |  |  |  |  |
| Read Level 4 RAM |  |  |  |  | A |  |  |  |  | B |  |  |  |  |  |  |  |  |
| Write Level 4 RAM |  |  |  |  |  |  |  |  | A |  |  |  |  |  | B |  |  |  |

Pile Node Entry for Strict Priority

Pile Node Entry for Weighted Fair Queuing

Pile Node Entry for Queuing with Weighted Fair Priorities

Pile Node Entry for Traffic Shapping

SYSTEM AND METHOD FOR SCHEDULING AND ARBITRATING EVENTS IN COMPUTING AND NETWORKING

CLAIM OF PRIORITY

This application is a Divisional Application of U.S. patent application Ser. No. 09/931,841 filed on Aug. 16, 2001, now U.S. Pat. No. 8,032,561 and entitled, "System and Method for Scheduling and Arbitrating Events in Computing and Networking," which is incorporated herein by reference for all purposes.

CROSS REFERENCE TO RELATED APPLICATIONS

This application relates to U.S. Pat. No. 6,952,696, entitled "Data Structure and Method for Sorting Using Heap-Supernodes" by Paul Nadj et al., filed on Nov. 28, 2000, issued on Oct. 4, 2005, owned by the assignee of this application and incorporated herein by reference.

This application relates to U.S. Pat. No. 7,007,021, entitled "Data Structure and Method for Pipeline Heap-Sorting" by Paul Nadj et al., filed on Nov. 28, 2000, issued on Feb. 28, 2006, owned by the assignee of this application and incorporated herein by reference.

BACKGROUND

1. Field of the Invention

The present invention relates to scheduling and arbitrating events in computing and networking, and more particularly to the use of the data structure known as a pile for high-speed scheduling and arbitration of events in computing and networking.

2. Description of the Related Art

Data structures known as heaps have been used previously to sort a set of values in ascending or descending order. Rather than storing the values in a fully sorted fashion, the values are "loosely" sorted such that the technique allows simple extraction of the lowest or greatest value from the structure. Exact sorting of the values in a heap is performed as the values are removed from the heap; i.e., the values are removed from the heap in sorted order. This makes a heap useful for sorting applications in which the values must be traversed in sorted order only once.

The properties of a heap data structure are as follows.

P1. A heap is a binary tree, or a k-ary tree where k>2.

P2. A heap is a balanced tree; i.e., the depth of the tree for a set of values is bounded to $\log_k(N)$, where N is the number of elements in the tree, and where k is described above.

P3. The values in a heap are stored such that a parent node is always of higher priority than all of its k descendent nodes. Higher priority means "higher priority to be removed from the heap".

P4. A heap is always left (or right) justified and only the bottom level may contain "holes" (a lack of values) on the right (or left) side of that level.

Property P2 is a reason that heaps are a popular method of sorting in systems where the sorted data must be traversed only once. The bounded depth provides a deterministic search time whereas a simple binary or k-ary tree structure does not.

Property P3 dictates that the root node of the tree always holds the highest priority value in the heap. In other words, it holds the next value to be removed from the heap since values are removed in sorted order. Therefore, repeatedly removing the root node removes the values in the heap in sorted order.

FIG. 1 is a conventional architectural diagram illustrating a tree-based heap data structure 10, with a level 0 of heap, a level 1 of heap, a level 2 of heap, and a level 3 of heap. Tree-like data structures such as heaps are typically depicted and implemented as a series of nodes and pointers to nodes. Each node comprises a value to be sorted. In the level 0 of heap, a node 11 stores a value of 5. In the level 1 of heap, a node 12 stores a value of 22, and a node 13 stores a value of 10. In the level 2 of heap, a node 14 stores a value of 26, a node 15 stores a value of 23, a node 16 stores a value of 24, and a node 17 stores a value of 17. In the level 3 of heap, a node 18 stores a value of 27, and a node 19 stores a value of 38.

FIG. 2 is a conventional architectural diagram illustrating an array-based heap data structure 20. It is well known in the art that balanced trees, such as heaps, may be constructed with arrays. The array-based heap data structure 20 eliminates the need to keep forward and backward pointers in the tree structure.

FIG. 3 is a conventional flow diagram illustrating the process of a heap remove operation 30. Once a root node 11 is removed, a "hole" is created in the root node position 11. To fill the hole in the root node 11, the bottom-most, right-most value (BRV) 12 is removed from the heap and is placed in the hole in the root node 11. Then, the BRV and the k descendent nodes are examined and the highest priority value, if not the BRV itself, is swapped with the BRV. This continues down the heap. This comparison and swapping of values is known as the "percolate" operation.

FIG. 4 is a conventional flow diagram illustrating the process for a heap insert operation 40. To add a value to be sorted into the heap, a slightly different kind of percolate operation is performed. The first hole 41 to the right of the bottom-most, right-most value is identified, and the new value is inserted there. This value is compared to the value in its parent node. If the new value is of higher priority than the parent value, the two values swap places. This continues until the new value is of lower priority, or until the root of the tree is reached. That is, the percolate continues up the tree structure rather than down it.

The described methods of adding and removing values to and from a heap inherently keeps a heap balanced: no additional data structures or algorithms are required to balance a heap. This means that heaps are as space-efficient as binary or k-ary trees even though the worst case operational performance of a heap is better than that of a simple tree.

A third operation is also possible: "swap". A swap operation consists of a remove operation whereby the BRV is not used to fill the resultant hole in the root node 11. Instead, a new value is immediately re-inserted. The percolate operation is performed is identical to the delete case.

Because the percolate operations for remove and for insert traverse the data structure in different directions, parallelism and pipelining of the heap algorithm are inefficient and difficult, respectively.

High-speed implementations of heaps seek to find a way to execute the heap algorithm in hardware rather than in a software program. One such implementation is described in U.S. Pat. No. 5,603,023. This implementation uses a number of so-called "macrocells," each consisting of two storage elements. Each storage element can store one value residing in a heap. The two storage elements in a macrocell are connected to comparison logic such that the greater (or lesser) or the two can be determined and subsequently be output from the macrocell. A single so-called "comparing and rewriting control circuit" is connected to each macrocell so the comparisons between parent nodes and child nodes can be accommodated. In every case, both child nodes of a given parent are in the same macrocell, and the parent is in a different macrocell.

The shortcomings of the heap data structure and of previous implementations are described in the following points:

S1. Efficient pipelined heaps cannot be implemented due to opposing percolate operations.

There are two completely different percolate operations described in the previous section: one is used to remove values from the heap in sorted order, and one is used to insert new values into the heap. The former operation percolates downward from the top of the heap, whereas the latter operation percolates upward from the bottom of the heap.

A pipelined hardware operation is similar to an assembly line in a factory. In a pipelined heap—if such a structure existed—one insertion or removal operation would go through several stages to complete the operation, but another operation would be in the previous stage. Each operation goes through all the stages. I.e., if stage $S_j$ is currently processing operation i, stage $S_{j-1}$ is currently processing operation i+1, stage $S_{j-2}$ is currently processing operation i+2, and so on.

However, since some operations flow through the heap in one direction (e.g., insertion), whereas other operations flow though the heap in the other direction (e.g., removal), an efficient pipeline that supports a mix of the two operations is difficult to construct. This is because a removal operation needs to have current, accurate data in the root node (property P3, section 4.1) before it can begin, but an insertion of a new value percolates from the bottom up (see section 4.1). Thus, an insert operation is executed before a subsequent removal operation can be started. This is the direct opposite of a pipeline.

A unidirectional heap that operates only top-down is in the public domain. To operate in this fashion, the insert operation computes a path through the heap to the first unused value in the heap. Additionally, a simple method is proposed for tracking this first unused position. However, this tracking method assumes that heap property P4 holds. Although this property holds true for a traditional heap, removal of this property is desirable to eliminate shortcoming S2, described below. Thus, a suitable unidirectional heap structure suitable for high-speed pipelining does not exist in the current state of the art.

S2. Pipelined implementations of heaps are difficult to construct in high-speed applications due to the specifics of the "remove & percolate" operation.

The operation that removes values from a heap in sorted order leaves a "hole" in the root node once the highest priority value has been removed. This hole is filled with the bottom-most, right-most value in the heap.

In order to fill the hole caused by a remove operation, a hardware implementation of a heap must read the memory system associated with the current bottom of the tree to get the last value of the tree. This requires (a) that the location of the bottom always be known, and (b) that the all the RAM systems, except the tree root, run faster than otherwise necessary. When the each of the $\log_k(N)$ tree levels of the heap has a dedicated RAM system, the required speedup is two times the speed otherwise required. (Placing the $\log_k(N)$ tree levels of the heap in separate RAMs is the most efficient way to implement a pipelined heap, if such a thing existed, since it has the advantage of using the lowest speed RAMs for any given implementation.)

Point (b) states that "all" memory systems must be faster because the bottom of the heap can appear in any of the $\log_k(N)$ memories.

Point (b) states that the memory must be twice as fast because the RAM is read first to get the value to fill the hole. The RAM may then be written to account for the fact that the value has been removed. Later, if the downward percolation reaches the bottom level, the RAM will be again read and (potentially) written. Thus, a single operation may cause up to 4 accesses to RAM. Only 2 accesses are necessary if the remove operation is optimized to avoid reading and writing the bottom-most level to get the bottom-most, right-most value.

S3. A conventional design may not be fully pipelined. That is, since there is only one "comparing and rewriting control circuit," and since this circuit is required for every parent-child comparison in a percolate operation, it is difficult to have multiple parent-child comparisons from multiple heap-insert or heap-remove operations being processed simultaneously. This means that an insert or remove operation is executed before a new one is started.

S4. A conventional design is structured so that it takes longer to remove values from deeper heaps than from shallower heaps.

S5. A conventional design is incapable of automatically constructing a heap. An external central processor is repeatedly interacting with the design to build a sorted heap. (Once the heap is correctly constructed, however, the values may be removed in order without the intervention of the central processor).

S6. A conventional design employs so called "macrocells" that contain two special memory structures. Each macrocell is connected to a single so called "comparing and rewriting control circuit" that is required to perform the parent-child comparisons required for percolate operations.

This structure means that a macrocell is required for every pair of nodes in the heap, which in turn means that:

The structure does not efficiently scale to large heaps since large quantities of these special memory structures consume more area on a silicon die than would a traditional RAM memory sized to hold the same number of heap values.

The structure is costly to rework into a k-ary heap where k>2 since comparison logic grows more complex with the number of values being compared.

S7. A conventional design does nothing to prevent the painful problem of using a value from the bottom of the heap to fill the root node during a remove operation. The conventional design provides dedicated hardware to facilitate this nuance of heaps.

Scheduling and arbitration is common technique in the field of computing and networking which requires a series of events to occur in a particular order. The order of events is typically determined by a number assigned to each event, based on desired start time, desired end time, or some other criteria. These events are typically stored in an event queue, executing in ascending or descending order of the assigned values. Schedulers often use several separate event queues to maintain order amongst a related set of events.

In computing and networking, these events are often periodic. This means that once the event has occurred, it is rescheduled to occur again sometime in the future. There are currently many techniques for scheduling events in computing and networking, each relying on some type of sorting technique. Events may be sorted initially (scheduling), leaving the dispatching entity to simply dispatch events in the given order; or the events may be dispatched in order by an entity that examines all of the events or a sub-set of events to determine the next event to dispatch, or the "winning" event (arbitration).

In one solution, an arbiter or a scheduler performs a linear search or linear sort algorithm over a small number of events. This solution can be implemented in both hardware and software, but does not scale well as the number of events increases. In addition, various data structures, such as heaps and binary search trees, can be used for scheduling and arbitration. Although the use of these data structures can be faster than simply performing a linear search, there are still many drawbacks.

If the number of events is small, hardware implementations of a scheduler can exploit parallelism to quickly examine all events and select the winner. Trees of such hardware logic can be constructed to increase the number of events that may be arbitrated. Unfortunately, the cost in power and die area on an integrated circuit becomes extremely great as the number of elements to compare increases. In addition, the arrangement of comparators in trees carries with it inherent propagation delays, making this solution impractical for high-speed applications with a large number of events.

A systolic array is another implementation suitable only for hardware. Unfortunately, like the comparator trees, systolic arrays require a considerable amount of hardware, costing a large amount of die area on an integrated circuit. In addition, if multiple event queues are required, each queue must be sized for the worst case number of events, even though it may be impossible to fully populate all the queues simultaneously, thus leading to greater hardware inefficiencies.

One of the most commonly used data structures for scheduling and arbitration is known as a "calendar." A calendar consists of a timeline and a pointer. Each entry (time-slot) in the timeline contains a list of all events that should occur at that time. As time advances, the pointer is incremented to reference the appropriate time-slot.

For many of today's computing and networking applications, speed of execution is absolutely critical. Linear searching has an execution time of O(N), while heaps and binary trees have an execution time of O(log N). Thus as the number of events that must be scheduled grows, the time it takes to arbitrate amongst them increases. This makes such techniques unsuitable for many high-speed applications. Moreover, heaps, binary trees, and linear sorts cannot take advantage of pipelining to increase speed of execution.

Although calendars operate with an execution time of O(1), the storage space required for implementation grows rapidly as scheduling resolution increases. Since the storage space for calendars grows linearly with the scheduling precision of the calendar, it is very expensive and hardware inefficient to support a high scheduling precision over long periods of time.

Moreover, because calendars are based on the concept of ever-increasing time, when multiple events occupy the same timeslot, time must stall while all events are dispatched. However, there are cases when an event takes a non-zero amount of time to complete, and where time cannot simply stop, such as when scheduling traffic on the Internet. In such cases when multiple events occupy the same timeslot, only one event can be dispatched, while the remaining events must be moved to the next available timeslot. This adds complexity to the algorithm as well as increased accesses to RAM, causing the execution time to increase significantly, thus rendering calendars unsuitable for certain high-speed applications.

A similar problem occurs when multiple priorities are used in the calendar to create a scheduler that gives priority to certain queues. When multiple events from multiple queues are placed in the same calendar timeslot, the calendar must do some additional work to determine which event should be serviced next. Furthermore, when the remaining events are moved to the next timeslot, additional work must be done to sort these entries in priority order with respect to any existing entries. An alternative to sorting is to have parallel timeslots, one for each priority that the calendar supports. This reduces algorithmic complexity and processing time, but it multiplies the storage space by the number of supported priorities.

Calendars do not handle "work conserving" scheduling and arbitration without a penalty of either time or storage. "Work conserving" has meaning when events are scheduled according to time. Work conserving means that as long as there is an event to dispatch, an event will be dispatched if it is the next winner, even though its previously calculated service time has not yet arrived. To provide a work conserving scheduler with a calendar, either: the algorithm needs run very fast to move the pointer through the timeslots until a scheduled event is found, or; the algorithm must run at some faster speed, or additional supporting data structures that consume additional storage space and cause additional algorithmic complexity are required to quickly find the next event. The memory accesses to the additional storage space can cause the algorithm to run more slowly, making it unsuitable for some applications.

SUMMARY

The present invention is directed to solving the problems of high-speed scheduling and arbitration in computing and networking with the use of a heap-like structure known as a "pile." Piles are an improvement on the data structure known as a "heap," a tree-based structure comprised of a series of information bearing "nodes" linked together.

The present invention uses piles in the implementation of high-speed scheduling and arbitration for computing and networking. The present embodiment of the invention further provides the option to support event swapping, wherein the currently dispatched event is simultaneously rescheduled to be dispatched again at a future time. Moreover, the present embodiment of the invention is able to support large numbers of event queues at high speeds, as well as multiple schedulers within the same memory.

It is also an object of the present invention to support a wide variety of scheduling paradigms, including but not exclusive to: strict priority scheduling, round-robin scheduling, round-robin scheduling within the priority levels of a strict priority scheduler, weighted fair queuing, traffic shaping, any combination of the aforementioned scheduling paradigms. It is still another object of the present invention to provide implementations for the prevention of timestamp rollover problems through the use of an indicator known as an "epoch bit".

BRIEF DESCRIPTION OF THE DRAWINGS

FIG. 10 is an architectural diagram illustrating a pipeline resource table in accordance with the present invention.

DETAILED DESCRIPTION

Figure 1:
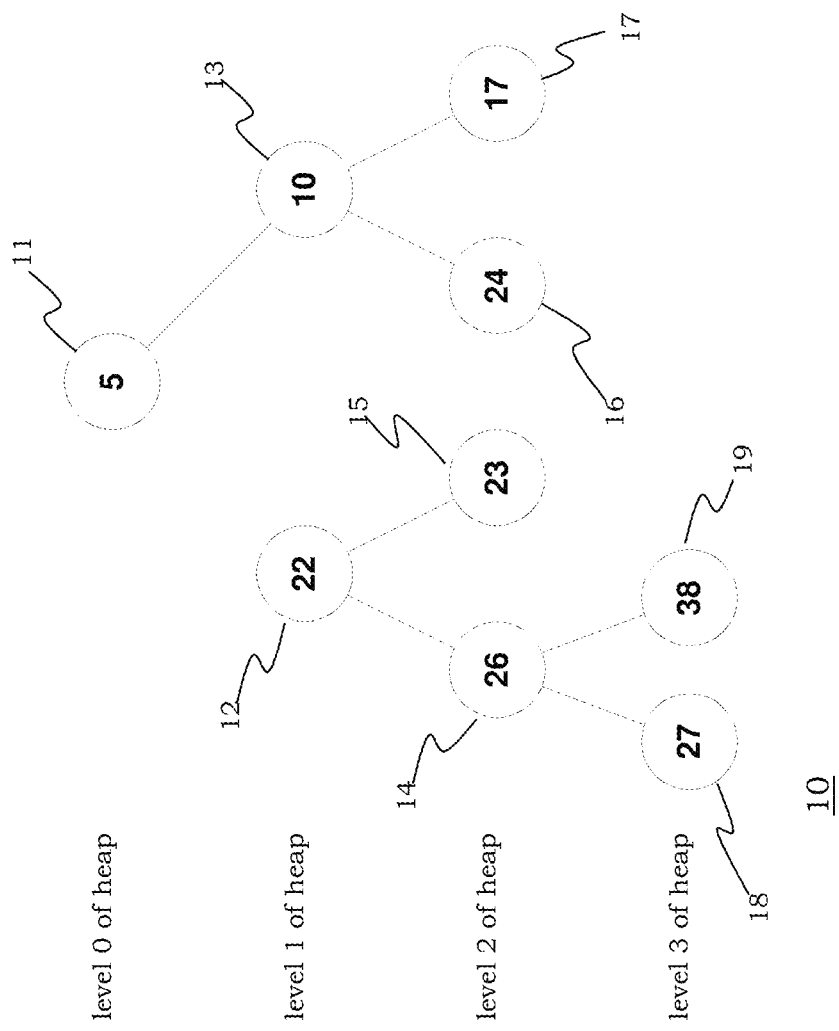
FIG. 1 is a conventional architectural diagram illustrating a tree-based heap data structure.
Figure 2:
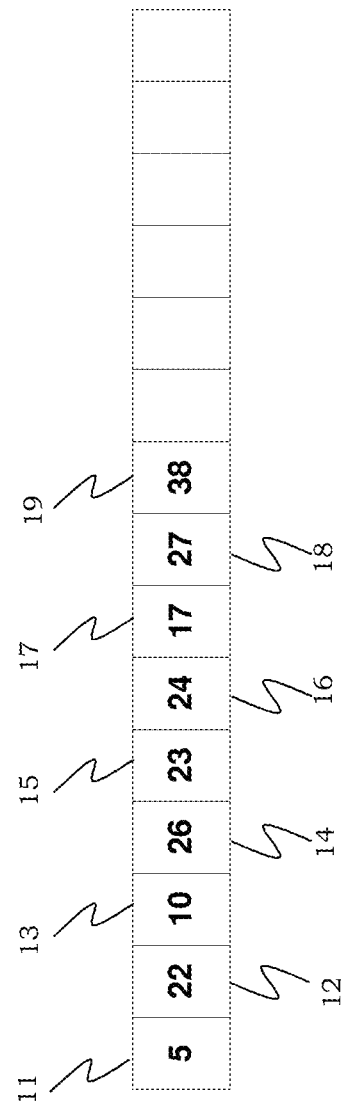
FIG. 2 is a conventional architectural diagram illustrating an array-based heap data structure.
Figure 3:
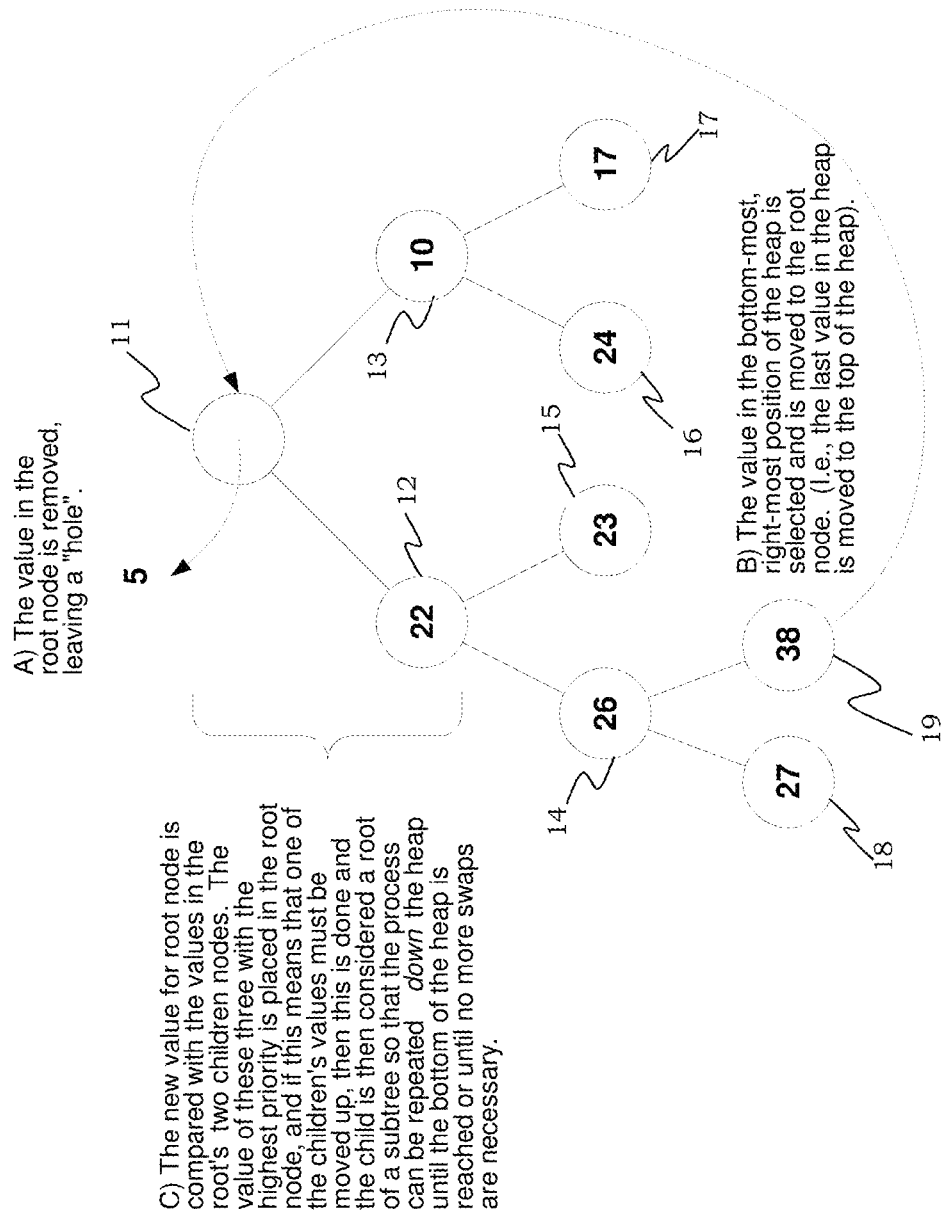
FIG. 3 is a conventional flow diagram illustrating the process of a heap remove operation.
Figure 4:
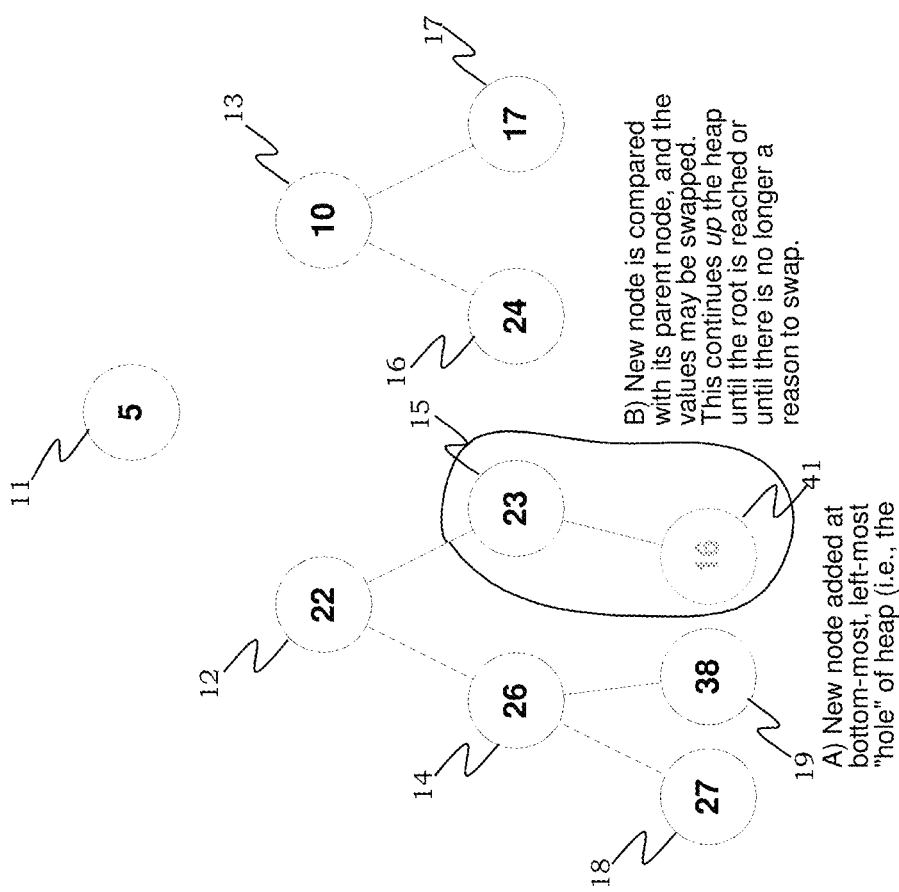
FIG. 4 is a conventional flow diagram illustrating the process for a heap insert operation.

Several aspects of piles are described below, which include heap remove operation, heap insert operation, combining an array implementation and a pointer implementation, a supernode structure, hole counters, multiple memory systems to construct a pipelined implementation of a heap-like data structure, multiple comparators to construct a pipelined heap implementation, and a pipelined heap with random commands, and a level cache to increase pipelined heaps processing.

1. Alteration of the heap remove operation, such that a hole may be percolated down the heap, with each hole behaving as the lowest priority value in the heap, and such that the hole may reside in any leaf position of the heap. The term leaf position applies equally well to an array-based implementation of a heap.

2. Alteration of the heap insert operation, such that the percolate operation operates on the heap data structure in a top-down rather than a bottom-up fashion, and such that the path followed by the percolate operation is not required to lead towards the first unused position in a traditional heap.

3. Using a combination of an array implementation and a pointer implementation of a heap to allow multiple dynamically-allocated pipelined heaps to co-exist within the same set of memories in an optimal fashion.

4. Combining nodes into a structure known as a "supernodes". A supernode is a set of $k^2$ sibling nodes from a k-ary tree, where k>=2; and where each supernode requires only k pointers to the next tree level when a pointer implementation of a heap used.

5. Use of counters at each logical or physical pointer that count the number of holes that appear in the data structure referenced by the logical or physical pointer. These counters are known as "hole counters": hole counters ensure a bounded-depth heap and they aid in dynamically resizing the heap.

6. A method that uses hole counters to aid in dynamically resizing the heap.

7. Use of multiple memory systems to construct a pipelined implementation of a heap-like data structure, where a memory system or a collection of memory systems represent a level or multiple levels of a heap-like data structure and where these memory systems may be accessed simultaneously.

8. The use of multiple comparators to construct a pipelined implementation of a heap-like data structure, where a comparator, or collection of comparators represent a level or multiple levels of a heap-like data structure and where these comparators may be actively doing work simultaneously.

9. Construction of a pipelined heap implementation capable of random mixture of insert, remove, and swap commands.

10. Use of a "level cache" to increase the speed of pipelined heaps beyond the point at which they would otherwise lose coherency.

Heap Remove Operation

A heap's remove operation requires that the last used position in a heap be constantly tracked so that the remove operation can find the last used position. The value in the last used position is used to replace the value removed from the root node.

This invention discloses a heap remove operation that entails allowing the hole itself, caused by removing the value in the root node, to percolate down the heap to any arbitrary leaf-node position. A hole is treated as the lowest priority value in the heap, with a priority equal to that of all other holes.

Since the heap does not grow in size when the removed value is replaced with a hole, the heap's overall depth remains bounded at a maximum of $\log_k(N)$. However, the heap no longer satisfies property P4.

Since a hole is placed in the root node rather than a non-hole value from the bottom of the heap, there is no point in tracking the last used position of the heap.

Since a hole is considered to have the lowest priority in a heap, after the percolate operation is complete, a hole resulting from a delete operation will always reside in a leaf node of the tree.

Heap Insert Operation

A fast implementation of a heap is to have all the operations performed on the heap to access the levels of heap in the same order, either top-to-bottom or bottom-to-top. Note that the remove operation accesses the heap in top-to-bottom order. Rather than target only the bottom-most, left-most hole, the insert operation in the present invention may target any hole in the heap. This allows an insert operation to access levels of the heap in a top-to-bottom order.

Creating Multiple Heaps Using an Array and Pointer Implementation

In a pipelined heap, it is advantageous to place different levels of the heap in different RAM systems. The fact that there are several RAMs rather than one does not impede an array-based implementation of a heap, as apparent to one skilled in the art.

An array-based implementation, however, has the disadvantage of being less flexible than a pointer based implementation since the various nodes may be easily rearranged in a pointer implementation simply by changing the pointers. An array-based implementation uses a fixed algorithm to determine parent and child nodes. This loss of flexibility makes it difficult to instantiate multiple heaps in the same memory system and further allow these instantiated heaps to grow and shrink in size (number of nodes) during the lifetime of the heaps.

A pointer-based implementation requires more memory than an array-based implementation since the pointer must be stored. A pointer-based implementation requires more time to traverse the heap than an array-based implementation since pointers may point to any given node in the memory system. This makes it difficult or impossible to ensure that a long read, such as a DRAM burst, or such as is inherently possible with very wide bit memories, will read multiple nodes that are of immediate use to the heap algorithm.

Figure 5:
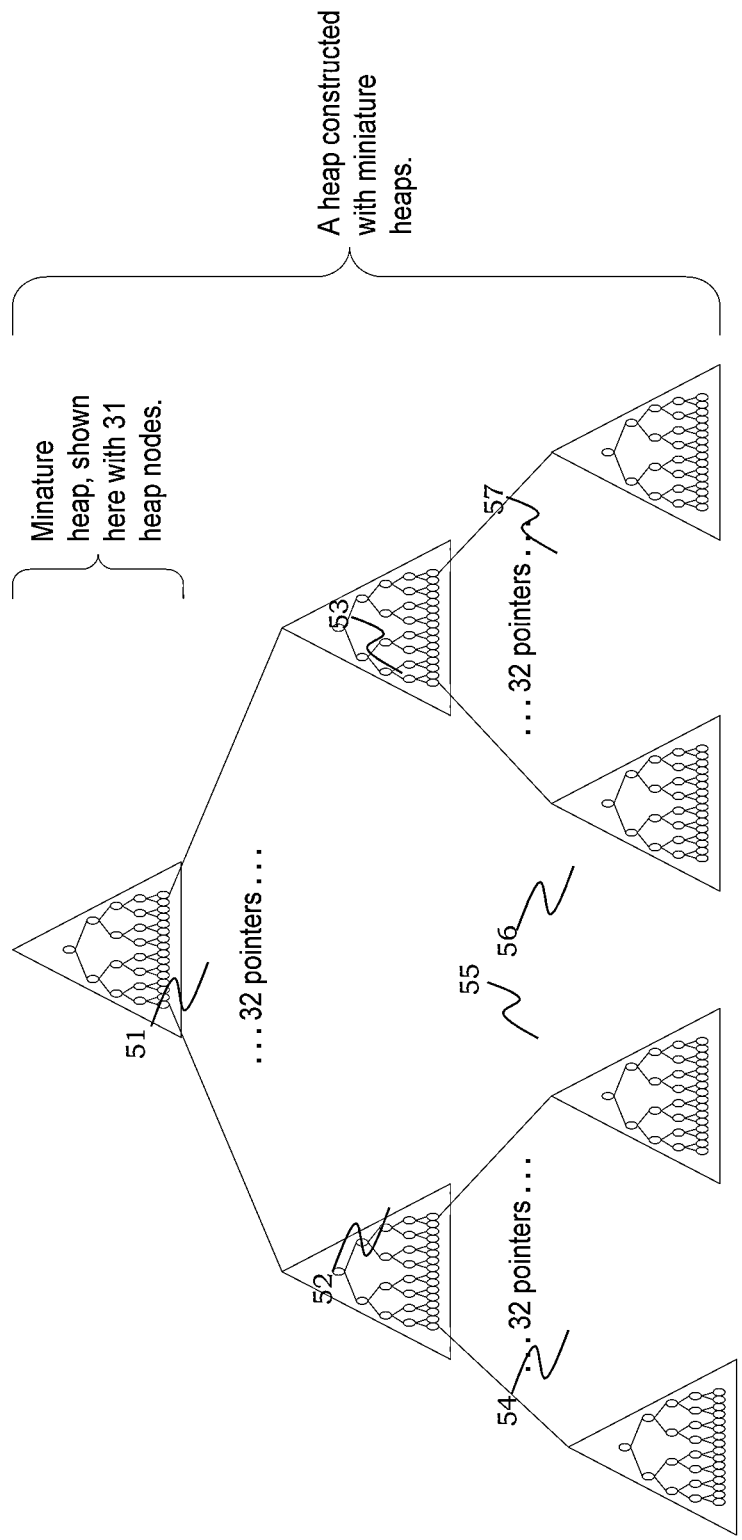
FIG. 5 is an architectural diagram illustrating heaps that are constructed from miniature heaps in accordance with the present invention.

To achieve the desirable properties of both array-based and pointer-based implementations in the same implementation, a combined structure may be used. FIG. 5 is an architectural diagram 50 illustrating heaps that are constructed from miniature heaps 51, 52, 53, 54, 55, 56, and 57. This structure groups nodes together into miniature heaps and stores them in an array along with a series of pointers to the child (and possibly parent) miniature heap. The location of each array in memory may then be random.

This arrangement of the heap data introduces a new level scheme. Rather than counting logical levels of single nodes, levels of miniature heaps can be counted. Each of these levels can be placed in a single RAM system to allow parallel pipelined access.

Supernodes

A further refinement can be made to miniature heaps, which are shown in an architectural diagram 50 as shown in FIG. 5. The miniature heaps are just that: heaps. This means that when a value is inserted or removed, the nodes that exist within a miniature heap must be shuffled around to satisfy the heap property P3.

To avoid this shuffling of values, a new structure is used. Like the miniature heap structure, a group of nodes are co-located in memory such that the nodes may be read with a single long or wide read. However, the nodes that are grouped together out of the traditional heap are different from the previous case.

The nodes grouped together are $k^2$ sibling nodes from k parents. The exception to this is tree root, which may be k nodes; or the exception to this is the tree root and next level, which may be a single node and k nodes, respectively.

Figure 6:
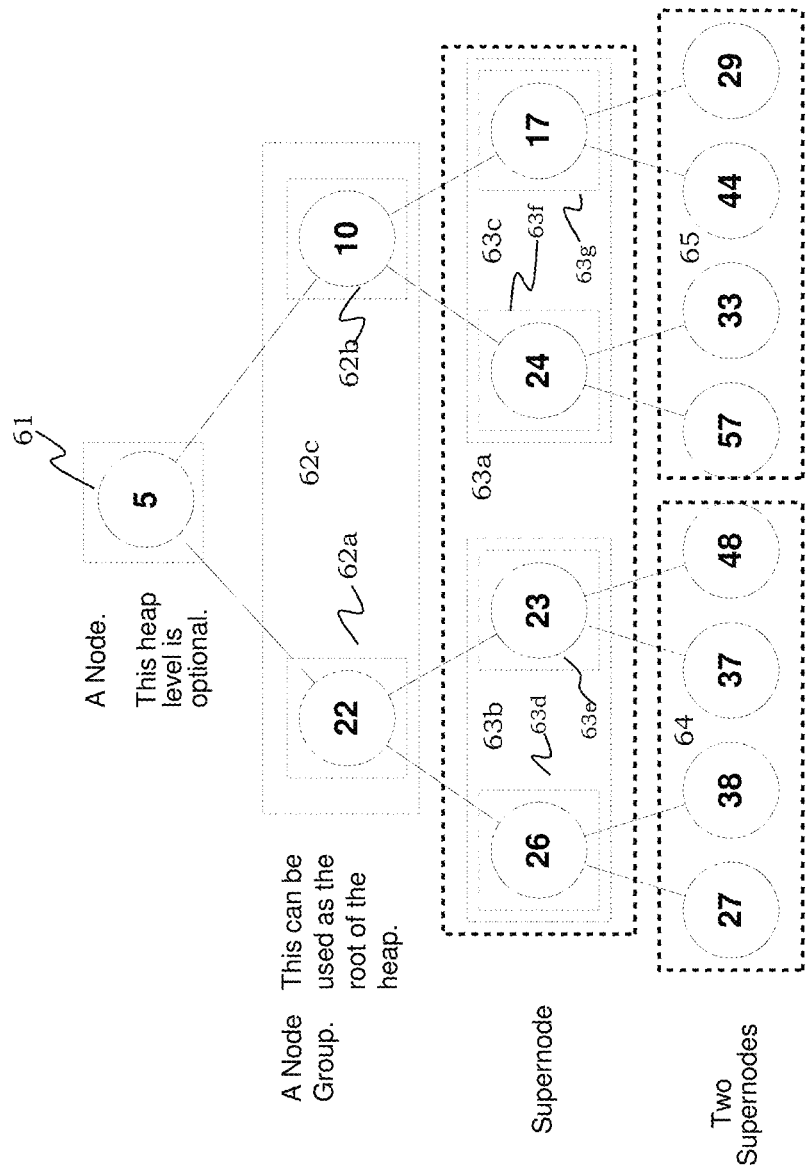
FIG. 6 is an architectural diagram illustrating a partitioning of a binary heap into supernodes with exceptions at the root in accordance with the present invention.

FIG. 6 is an architectural diagram 60 illustrating a partitioning of a binary heap (k=2) into supernodes with exceptions at a root node 61. Nodes 62a and 62b forms a node group 62c. Two node groups make up a supernode. Optionally, the node group 62c can operate as the root of the heap. A supernode 63a includes two node groups of 63b and 63c, where the node group 63b contains nodes 63d and 63e, and the node group 63c contains nodes 63f and 63g. In the bottom level of heap, two supernodes 64 and 65 are constructed.

The $k^2$ nodes in a supernode are arranged as k "node groups" each with k child nodes from a unique parent, and where each node group has an associated pointer to its child supernode. Note that the position of a node in a node group is related to the position of the node's child node group in a supernode.

This arrangement of nodes means three things: the potential of long and/or wide memory can be used since, for example, only one read must be performed to retrieve all the siblings of k nodes; heap percolate operations do not have to be performed within one of these blocks of memory; and fewer pointers are required than in the case of miniature heaps.

In summary, the idea behind supernodes is also that supernodes are a set of node groups placed in "adjacent" memory, such that either a wide read or a burst read will return the entire supernode. However, k−1 of the node groups in the supernode are not needed by the heap or pile operation (insert, remove, or swap) currently being executed: these k−1 node groups are for other paths down the heap that will not be traversed by the operation currently being executed. The supernode structure allows an operation to speculatively read data that it might need, before it knows exactly what it does need. This results in faster heap or pile operations because the required time to retrieve data from memory can pass in parallel with some of the heap algorithms. The data that the operation does need is ensured to be there but there is additional data that is not needed at that point in time. Thus, a supernode is not just an arbitrary block of $k^2$ nodes. It is a block of k node groups, each with k nodes. The k node groups are siblings of each other in the heap, and only one sibling is needed for any given path through the heap. In other words, supernodes are arranged in a data structure for speculatively reading children in a heap before the exact child is known.

This supernode structure is distinctly different from speculative reads in conventional heap implementations. In a conventional implementation the values that have been speculatively read are required to determine which values to keep. This means that the work of reading the data and the work of determine which data to keep cannot be done in parallel. With supernodes, the work can be done in parallel.

Figure 7:
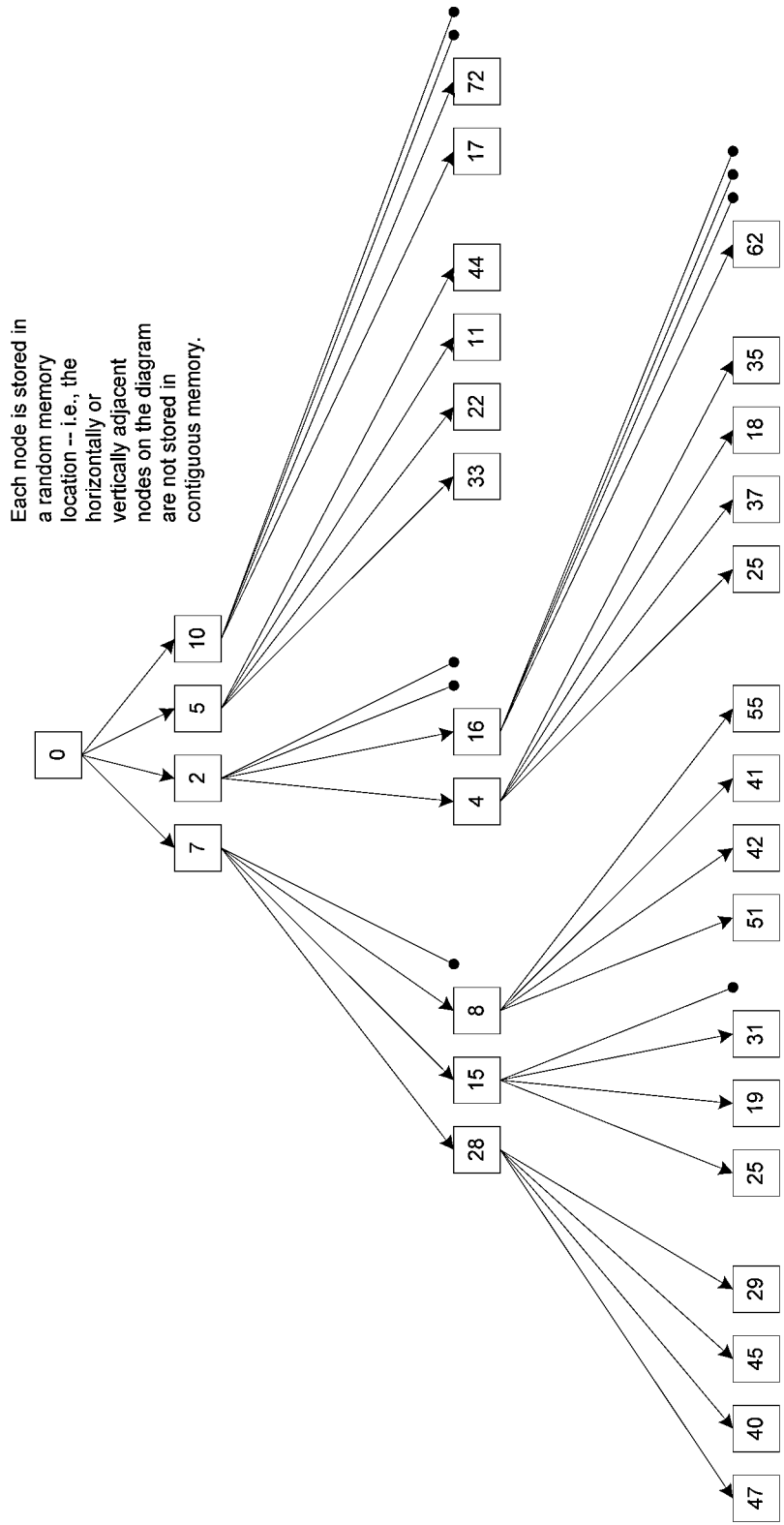
FIG. 7 is an architectural diagram illustrating a four-way heap that allows holes to percolate in any leaf node in accordance with the present invention.
Figure 8:
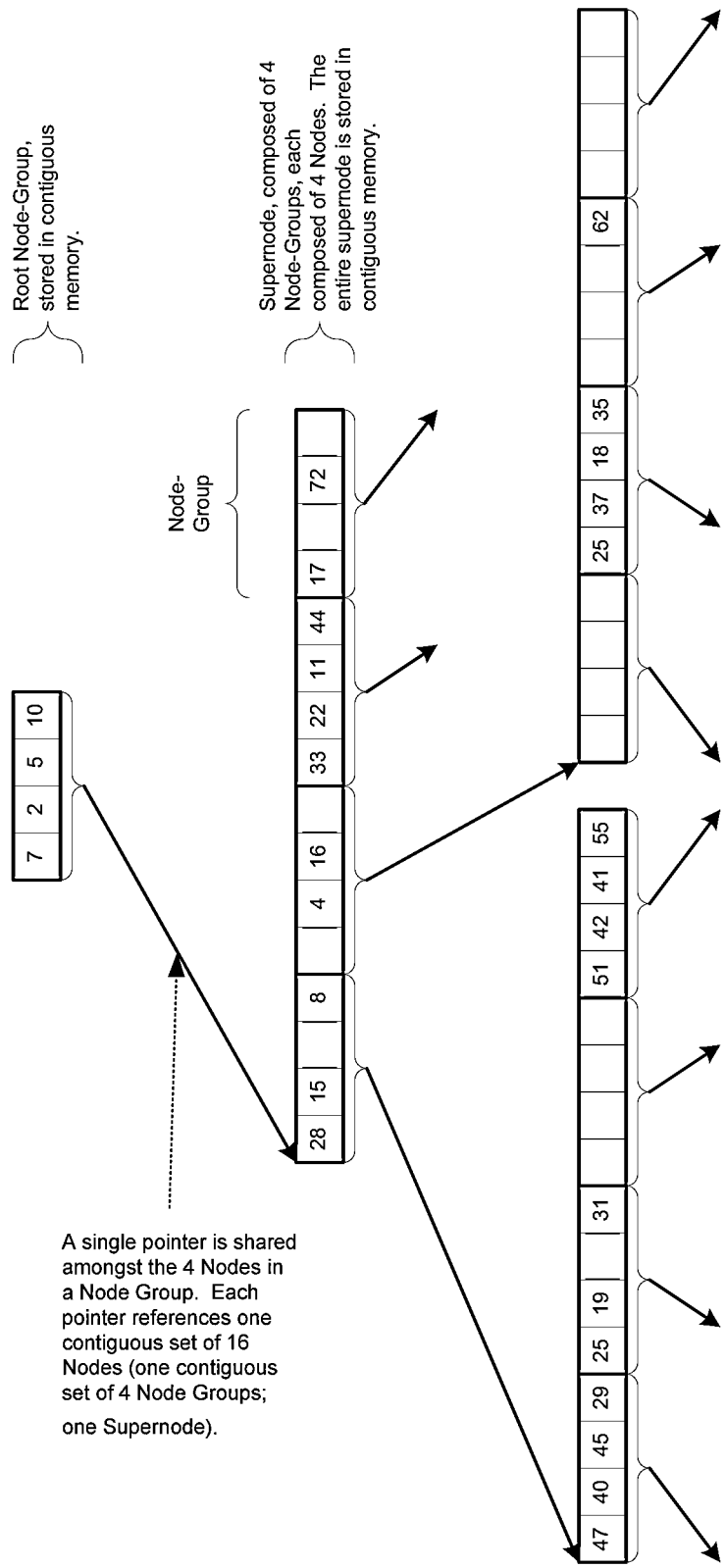
FIG. 8 is an architectural diagram illustrating a four-way heap constructed with supernodes in accordance with the present invention.

A k-ary heap (where k=4) that allows holes in any leaf position is shown in FIG. 7. FIG. 8 is an architectural diagram illustrating the same four-way heap, but constructed with supernodes. The supernode version of the heap is constructed using a node group for the root rather than a single node. This means that the maximum storage capacity of the heap with supernodes is one less than the other heap.

The remove operation for such a heap is as follows. This assumes that a k-way root node is used. Modification to derive the case for a single root node is obvious.

The root node group is read and the highest priority node is found and replaced with a hole. The value may be found by a k-way comparison. Since a node group has a pointer to its child supernode, the child supernode may be pre-fetched before the comparisons are started.

Once the comparisons are complete and the child supernode has been read from memory, (k−1) of the child node groups within the supernode may be discarded. The (k−1) child node groups were retrieved only to ensure that regardless of the result of the comparison on the root node, the correct child node would be available.

The remaining one node group of the supernode is examined to find the highest priority node. Also, since the node group has a pointer to its child supernode, the supernode may be pre-fetched before the comparison is started. The highest-priority value is exchanged with the hole in the parent node.

The remaining one node group is now treated as the root of a sub-heap, and the described steps repeat until the bottom of the heap is reached, or until the algorithm detects that a hole would be swapped with another hole.

The insert operation behaves similarly to the delete operation.

A different embodiment of the invention of supernodes entails keeping the values in a node group in sorted order to avoid comparisons during removal.

Use of Hole Counters at Each Logical or Physical Pointer

In a heap where holes are allowed, it becomes necessary to find these holes during an insert operation. An insert operation adds new values to a heap, and since a heap must abide by property P2 to give deterministic behavior, these values must occupy existing holes in the heap.

This invention describes a heap with holes that allows holes to occupy any leaf position. For an insert operation to ensure that a new value is swapped into a hole by the time percolation is complete, it needs to be able to find these "randomly" scattered holes.

In a pipelined implementation where each level of nodes (or miniature heaps, or supernodes) resides in a separate memory system, it is not productive to repeatedly read or write a level. Using a single bit at each pointer (or logical pointer in an array-based implementation) to indicate that there is a hole somewhere below in the heap does not solve the problem since an operation does not know whether to change the state of the bit until it much later determines the number of holes that are present in the sub-heap.

Instead, a counter can be associated with every pointer. This counter is an accurate representation of the number of holes in the sub-heap below the pointer. Because any insert operation will ultimately succeed once it traverses a non-zero counter, each counter may be decremented as the pointer is traversed. There is no need to return to the counter later to update it.

Similarly, during a remove operation, it is ensured that a hole will be created under every pointer that is traversed. Therefore each counter may be incremented as each pointer is traversed.

Use of Multiple Memory Systems in a Heap for Pipelining

Pipelining allows a second operation to start before the first operation is finished, analogous to an assembly-line process.

Heaps are difficult or impossible to implement in a pipelined fashion in hardware because many memory accesses need to be performed on the same memory system. This contradicts the very definition of pipelining, which states that each unit of work to be done is performed by a dedicated resource, independent from all the other resources required to perform the previous or remaining work.

To pipeline a heap, nodes for each level of the heap are allocated from a different memory system. This allows one operation to be accessing one memory system whilst a subsequent operation is accessing another memory system.

Figure 9:
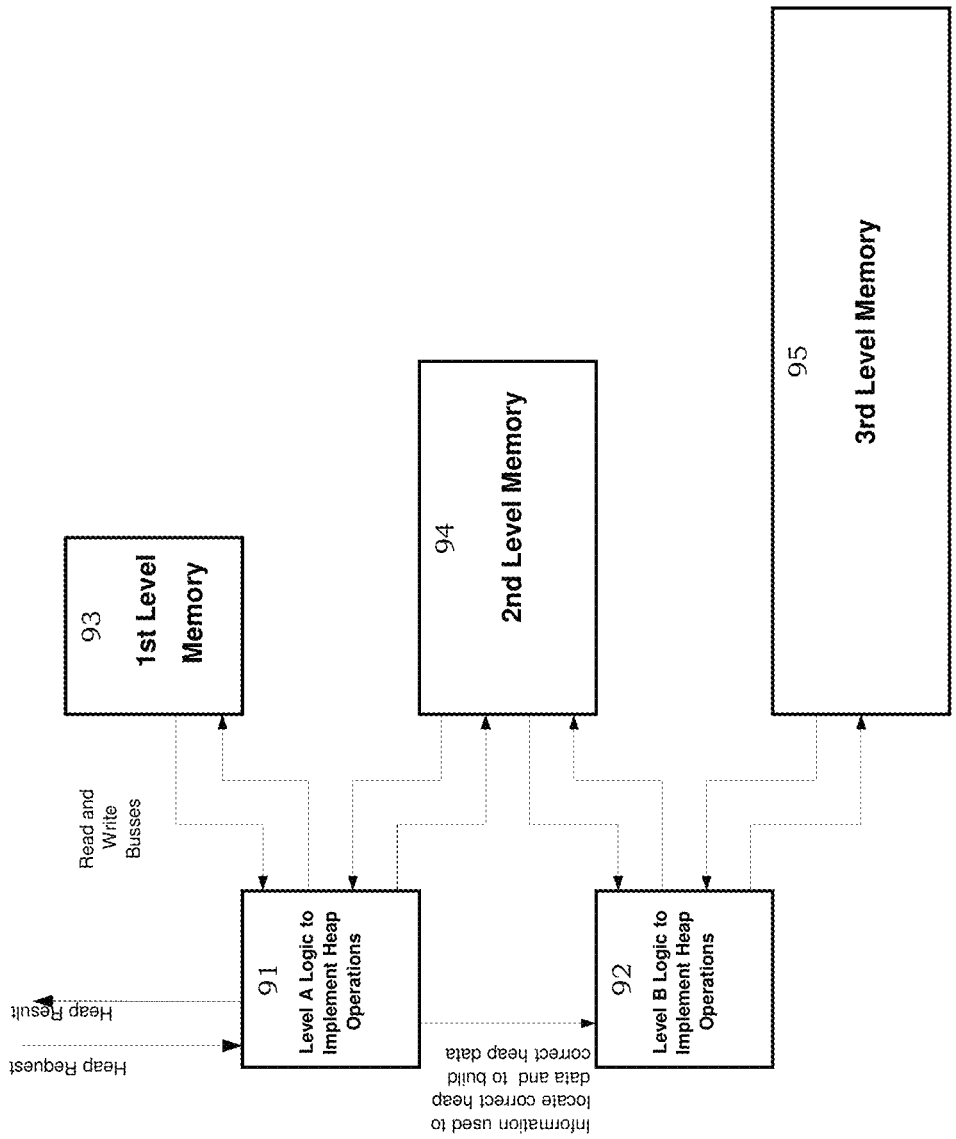
FIG. 9 is an architectural diagram illustrating a pipelined heap implementation in accordance with the present invention.

However, the percolate operation swaps two values from two adjacent levels, so each stage in the pipeline requires access to two memory systems. The logic and RAM systems are laid out as shown in an architectural diagram 90 in FIG. 9

This arrangement allows an application to complete $\log_k(N)$ more operations per second than previous implementations. For example, a 4-way pipelined pile realizes a five times speedup over a 4-way traditional heap when 1000 entries are sorted. Alternatively, this arrangement allows the memory to run at $1/(\log_k(N))$ times the speed of a single memory system, and maintain the same number of completed operations per unit time. Memories that operate at lower speeds are typically cheaper than memories that operate at higher speeds.

The diagram and text show that each memory contains one level of a pipelined heap in a first level memory 93, a second level memory 94, and a third level memory 95. Level A logic 91 reads and writes both the first level memory 93 and the second level memory 94. Level B logic 92 reads and writes both the second level memory 94 and the third level memory 95. Level A logic 91 can send information to level B logic 92 so that values can be percolated through the memories of the data structure in a top-to-bottom order. Note that a memory that operates at twice the speed as the other memories, for example, may support twice the number of heap levels. Such arrangements are included in this claim.

Because of inability to pipeline a heap, the only reason to place different tree levels of the heap in separate physical memories in a conventional design is to create a larger heap. However, placing the different tree levels of the heap in separate physical memories in a pipelined implementation is another feature in the present invention.

Furthermore, it should be noted that using several memory systems for the purposes of pipelining applies equally well to heaps constructed in other means, such as via miniature heaps and via supernodes. However, these examples are intended to be illustrative, and do not limit the scope of the present invention. An example pipeline resource diagram 100 is shown in FIG. 10. After heap request "A" (either an insert, remove, or swap operation) is read from Level 1 RAM in the first cycle, heap request "B" (either an insert, remove, or swap operation) is then pipelined and read during the seventh cycle. If a pipelined operation was not present, an arbitrary heap request "B" could not start until the eleventh cycle, the time when heap request "A" is fully complete. The time at which heap request "B" could start increases as the number of levels in the heap increases, and therefore increases as the number of values to sort increases.

Use of Multiple Comparator Blocks in a Heap for Pipelining

Figure 11:
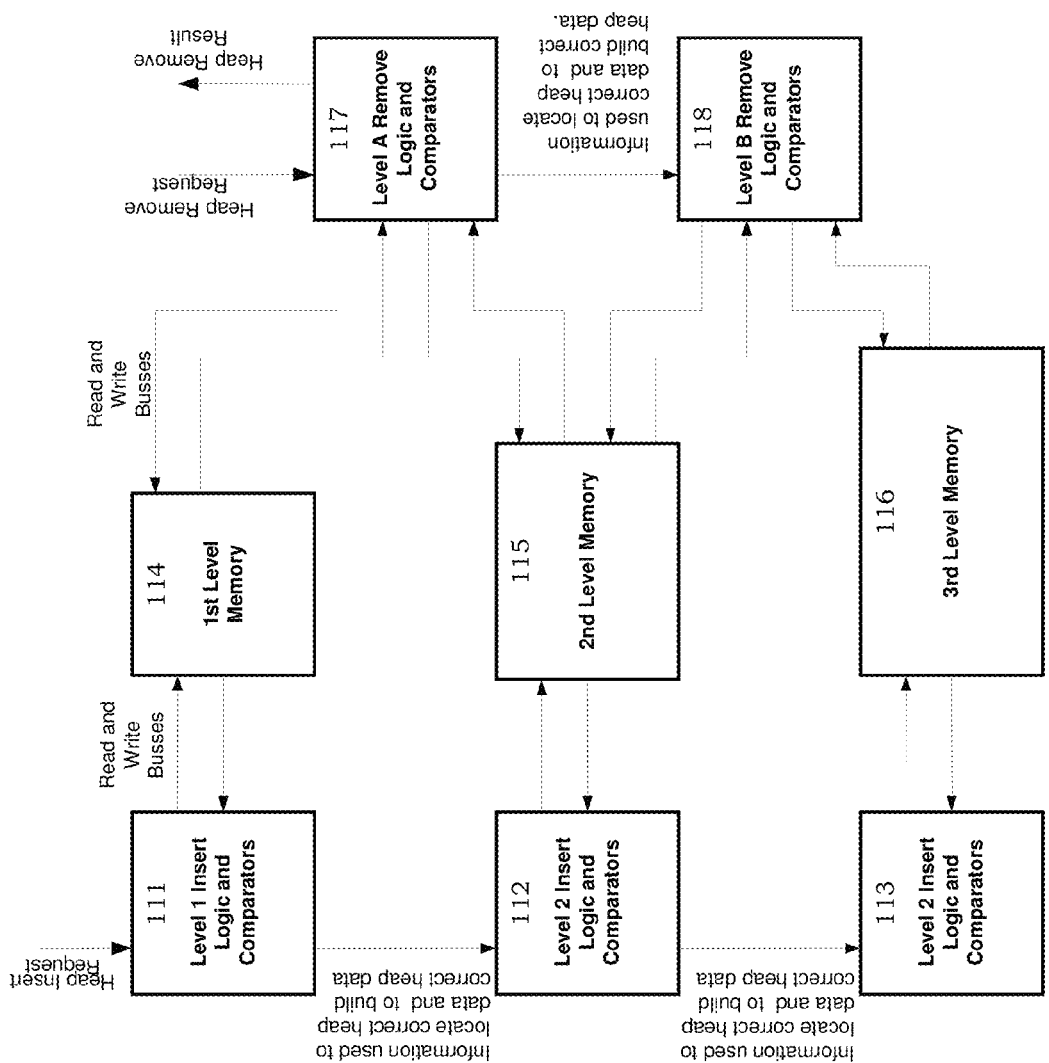
FIG. 11 is an architectural diagram illustrating a multiple comparator blocks in a pipelined heap in accordance with the present invention.

FIG. 11 is an architectural diagram 110 illustrating a multiple comparator blocks in a pipelined heap. Each memory system 114, 115, and 116 is associated with a respective block of comparators 111, 112, or 113. Insert logic and comparator blocks 111, 112, and 113 include of k comparators that examine the k hole counters in a node group. Depending on the desired insert algorithm, the left-most hole counter, the right-most hole counter, or the largest hole counter, or the smallest hole counter could be chosen as the winner of the k comparisons. The winning hole counter is used to direct the percolate operation down the heap.

The block further includes either k or one comparators that compare the value to be inserted with either the k node values or with the 1 winning node value. When k node values are compared, it should be understood that only the result of 1 comparison is kept: the result that corresponds to the winning hole counter. The winner of the value comparisons determines whether or not the new value to be inserted must be swapped with an existing value in the node group.

If the values are swapped, the new values are in the node group and the old value has been removed from the node group. The old value is given to the comparator block at the next level in the heap, and the procedure repeats.

The diagram shows "remove" comparator blocks 117 and 118. These blocks each consist of k comparators that examine the k node values in a node group. The value with the highest priority is selected and removed from the node group. The value to be removed corresponds to a node group at the next level in the heap. The comparator block associated with that new level will fill the hole created at the original level with the winning value. This repeats down the heap.

Construction of a Pipelined Heap with Random Operations

There is no pipelined hardware implementation of a conventional heap that is capable of supporting a random mixture of insert, remove, and swap operations without stalling the pipeline to wait for an operation to complete. E.g., a heap that is not uni-directional, like the heap invented herein, needs to complete fully a series of insert operation before a remove operation can begin, although it may be possible to pipeline a series of like operations.

A pipelined heap implementation, such as that shown in FIG. 11, is capable of a random mixture of any or all of insert & remove; insert & swap; remove & swap, and; insert, remove & swap.

Use of a Level Cache

The execution speed of a pipelined implementation of a heap that uses multiple comparator blocks and multiple memories is limited by the speed of the memories.

Behavior of the Insert Operation

In this implementation, each insert request performs a memory read to retrieve a supernode. (At the root node and second tree level, only portions of supernodes need to be read). As previously described, a node group is isolated and comparisons are performed. A swap of the new value and a value in the node may be performed, altering the contents of the node group. The new node group must then be written back to memory. The memory system associated with the next level of the heap is then accessed, repeating the above operations.

This means that if the memory runs at X operations per second, X/2 insert operations per second can be completed.

Behavior of the Remove Operation

In this implementation, each remove request performs a memory read to retrieve a supernode. A node group is isolated and comparisons are performed. A value to be removed is identified. At the root level, this value is returned to the initiator of the remove operation.

Removing the value leaves a hole. The altered node which now contains the hole need not be written back immediately. Recall that only a read has been performed so far. The next level supernode can be read, and the same steps are followed until a winning value is determined. This value is used to write back the original node group.

The sequence of events is in a four-level heap is as follows:
1. Read Level 1
2. Find Winner in Level 1
3. Read Level 2
4. Find Winner in Level 2
5. Write Level 1, using winner from Level 2
6. Read Level 3
7. Find Winner in Level 3
8. Write Level 2, using winner from Level 3
9. Read Level 4
10. Find Winner in Level 4
11. Write Level 3, using winner from Level 4
12. Write Level 4, containing a hole in place of the winner of Level 4

Thus, each memory system is accessed only twice, and a memory running at X operations per second is capable of X/2 heap remove operations per second.

Implications of the Above, and the Use of a Level Cache

Note that the time between reads and writes to the same memory, especially in the remove operation, is long. Comparisons need to be done to find the winner, and as memory speeds increase the time to perform these comparisons is significant. Because of this delay between the reads and writes, it is possible that an operation (operation 1) following another operation (operation 2) will read the same node group from memory that operation 1 is modifying, but has not yet written back in to the RAM. Operation 2, therefore, receives a stale copy of the data.

This problem may be solved either by reducing the rate of heap operations, or by increasing the speed of the memory. Either way, the theoretically maximum rate of X/2 heap operations per second cannot be achieved. Another way to solve the problem is run the comparison operations faster. However, this can be expensive and technologically challenging when the speed required challenges the state of art for logic design and manufacturing.

One way to solve the problem is to implement a cache for node groups read from memory. When operation 2 accesses the same node group that operation 1 is modifying, operation 2 retrieves the data from the cache rather than from the memory. Because there is latency between the start of a read memory operation and the time at which the retrieved data is available, there is adequate time to consult the cache, and adequate time for operation 1 to complete its modifications to the cache. The X/2 rate can be achieved with low comparison speeds even as the memory speeds increase.

The size of the cache is practical from an implementation standpoint. To allow any combination of requests that access the same nodes repeatedly, the cache depth only needs to have one entry per level. This is because requests need to be serviced sequentially in a heap to ensure correct data is available at all times, and therefore one request must finish modifications to a level before another request uses the data in that level.

This aspect of the invention also includes, however, different caching structures that contain more than one entry per level. This can be useful when statistical gain is exploited for higher performance. Recall that the cache is required when the node for one level is being modified but has not been committed to memory, and another request attempts to read that node from memory. If the length of time an implementation consumes to compute the "winners" for a level is long, the implementation can still use a high request rate and know (or hope) that the dynamics of the system are such that requests which are close in time will not typically access the same set of nodes. Accessing the same node "too soon" would force cause the request completion rate to temporarily slow down while the implementation waits for the nodes to have stable information.

Figure 12:
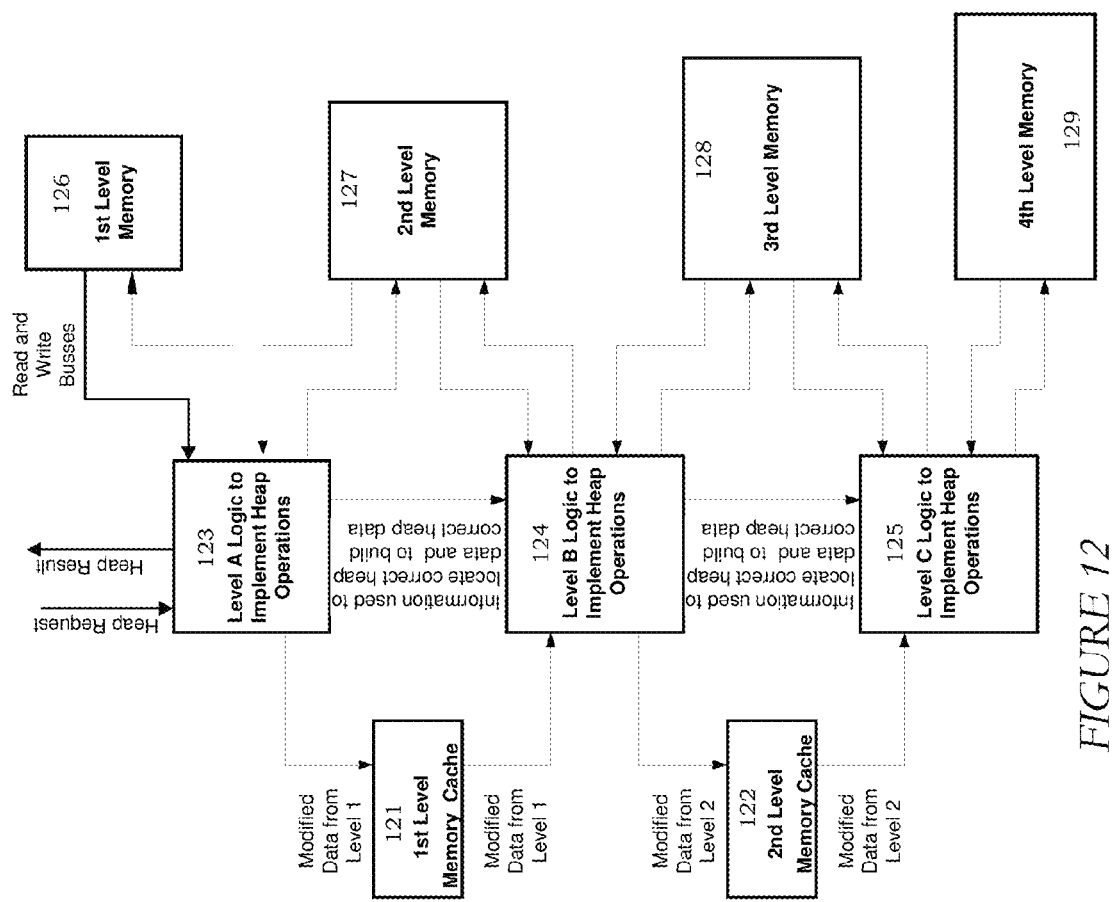
FIG. 12 is an architectural diagram illustrating a pipelined heap with level caches in accordance with the present invention.
Figure 13:
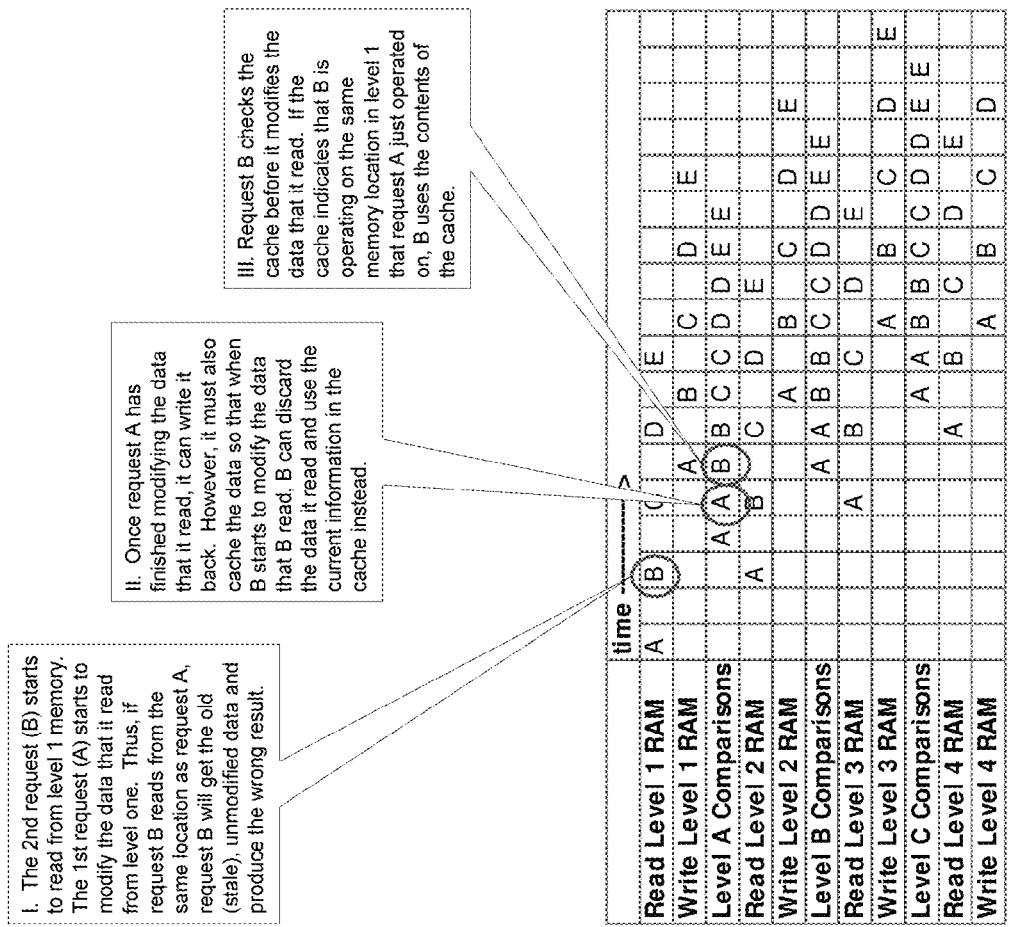
FIG. 13 is an architectural diagram illustrating a resource diagram showing use of level caches in accordance with the present invention.

In such a scheme many requests are being processed between a read from level n and a write to level n, many nodes must be cached. FIG. 12 is an architectural diagram 120 illustrating a pipelined heap with level caches, while FIG. 13 is an architectural diagram illustrating a resource diagram 130 showing use of level caches. A first level memory cache 121 is placed between a level A logic 123 and a level B logic 124. A second level memory cache 122 is implemented between the level B logic 124 and a level C logic 125. The first and second level memory caches 121 and 122 speedup the overall processing performance. On the other side, the level A logic 123 communicates information with a first level memory 126 and a second level memory 127, the level B logic 124 communicates with a second level memory 126 and a second level memory 127, and the level C logic 125 communicates with a first level memory 126 and a second level memory 127

The above embodiments are only illustrative of the principles of this invention are not intended to limit the invention to the particular embodiments described. For example, one of ordinary skill in the art should recognize that the supernode concept can be selected as k node-groups, in which k denotes the number of optimal node-groups to suit a particular design. Accordingly, various modifications, adaptations, and combinations of various features of the described embodiments can be practiced without departing from the scope of the invention as set forth in the appended claims.

Piles for Scheduling and Arbitration

One application of a pile or heap-like data structure is for use in scheduling and arbitration in computing and networking. It is apparent to one of ordinary skill in the art that the term "queue" indicates an "ordered list of events to be processed". Other similar or equivalent terminologies, such as "event queue" or "event", may be practiced without departing from the spirits in the present invention.

One embodiment of the invention uses the data structure known as a pile for high-speed scheduling and arbitration of event queues in computing and networking, where herein an "event queue," or simply "queue," is a single event or a plurality of ordered events. The use of piles for scheduling and arbitration can be implemented in software using a general purpose processor or in hardware, such as an integrated circuit.

Figure 14:
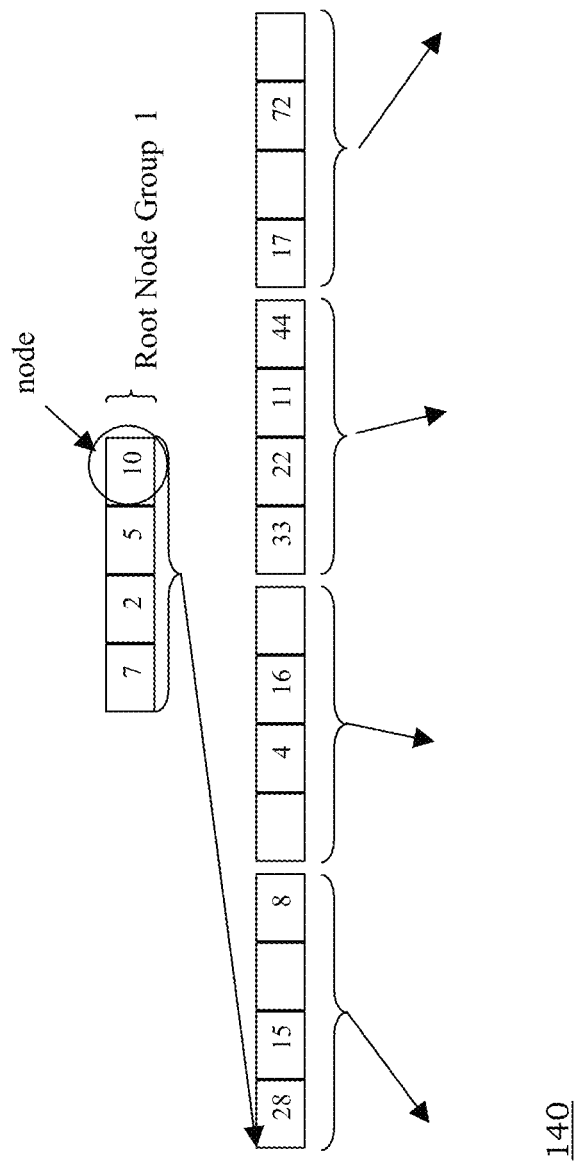
FIG. 14 is a data structure illustrating an example of a pile in accordance with the present invention.

FIG. 14 is a data structure illustrating an example of a pile 140 in a loosely sorted tree-like data structure, with properties that are highly beneficial to the scheduling and arbitration of events. For networking and computing applications, piles can be used to quickly sort a set of queues or events to determine in what order they must be serviced. A pile node 150 in FIG. 15 in the pile contains a sort index 151, and a data block 152. For scheduling and arbitration purposes, queues of events are assigned an index and a unique identifier (called a "queue identifier"). The index is related in some way to the priority or relative order in which the various queues are to be serviced. Together, the index and queue identifier represent the event at the head of the event queue. The index and identifier (the event) are placed in the sort index field 151 and data block field 152 respectively of a node at the root of the pile, and through a sequence of swapping operations, the node percolates down through the levels of the pile to a level consistent with the priority or relative order of the event with respect to the other events in the pile. Through this sorting action the root node or node group of the pile is ensured to hold the highest priority event. When an index and queue identifier (an event) are removed from the pile at the root node, the empty node left by the removal percolates down the levels of the pile in the same manner as a newly inserted event. Herein an empty node is called a "hole." This pile sort algorithm allows events to be scheduled quickly and efficiently.

Figure 16:
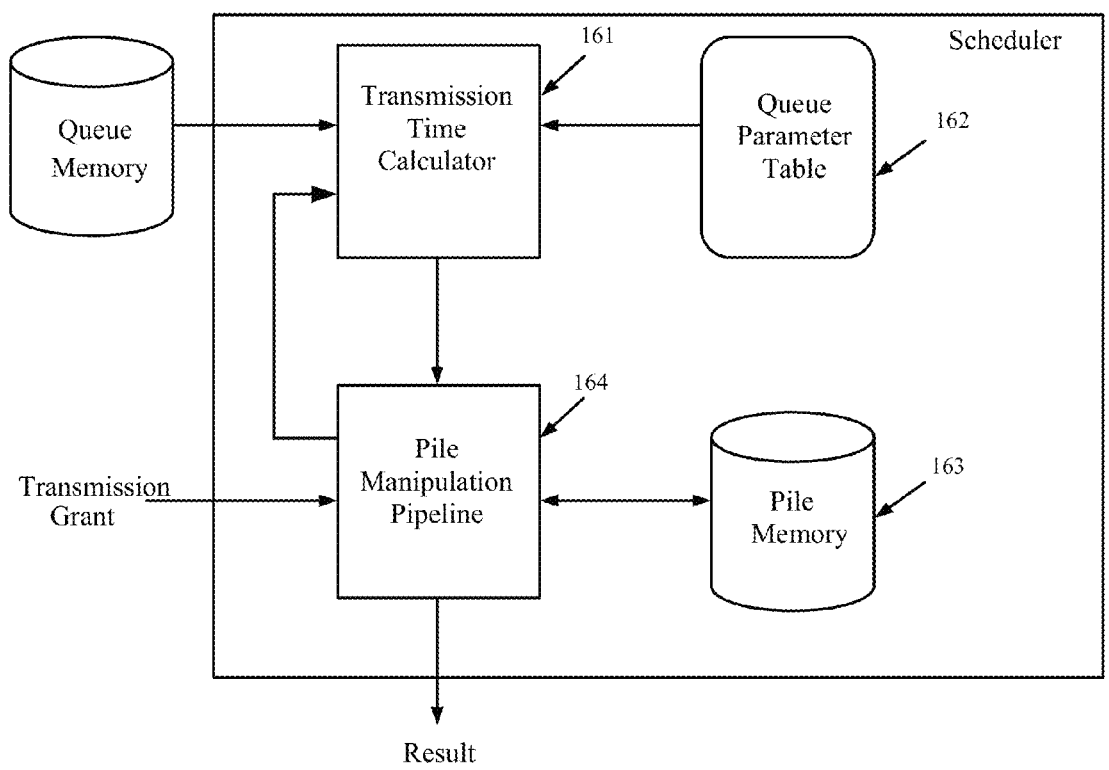
FIG. 16 is system diagram illustrating one embodiment for hardware implementing a pile node in accordance with the present invention.

FIG. 16 is system diagram 160 illustrating one embodiment for hardware implementing a pile node in accordance with the present invention. When a packet to be transmitted on an Internet link arrives in an empty queue, the Transmission Time Calculator 161 computes the transmission time of the packet. The transmission times are determined by the desired service rates stored in the Queue Parameter Table 162, or by "hard-coded" properties of the queue. The transmission time, along with the queue identifier, is placed on the pile in a pile node by the Pile Manipulation Pipeline 164. The pile node resides in the Pile Memory 163. The transmission time is placed in the sort index 151, and the queue identifier is placed in the data block 152. When the proper transmission time for a queue in the pile's root node has been reached, the queue is removed from the pile and sent to an event handler for execution, while parallel hardware reexamines the queue to determine whether or not it needs to be rescheduled with a newly calculated transmission time.

In one embodiment of the invention, event queue identifiers are stored in the pile nodes, with each node corresponding to one event queue. The pile nodes are loosely sorted, but due to the unique nature of the pile sorting algorithm, the root node is ensured to contain the next event queue to be processed in O(1) time. The sorting of nodes can be done by a general purpose microprocessor, a special purpose ASIC, or other hardware apparatus. (In varying embodiments of the invention, the root of a pile may contain multiple nodes. In this case, arbitration is required to find the "winning" event. The arbitration of the "winning" event, where "winning" is taken to mean the properly chosen next event to process, in the root node can be performed by parallel comparators, a linear search, or a binary tree, but is not constrained to these methods of arbitration.)

Figure 21:
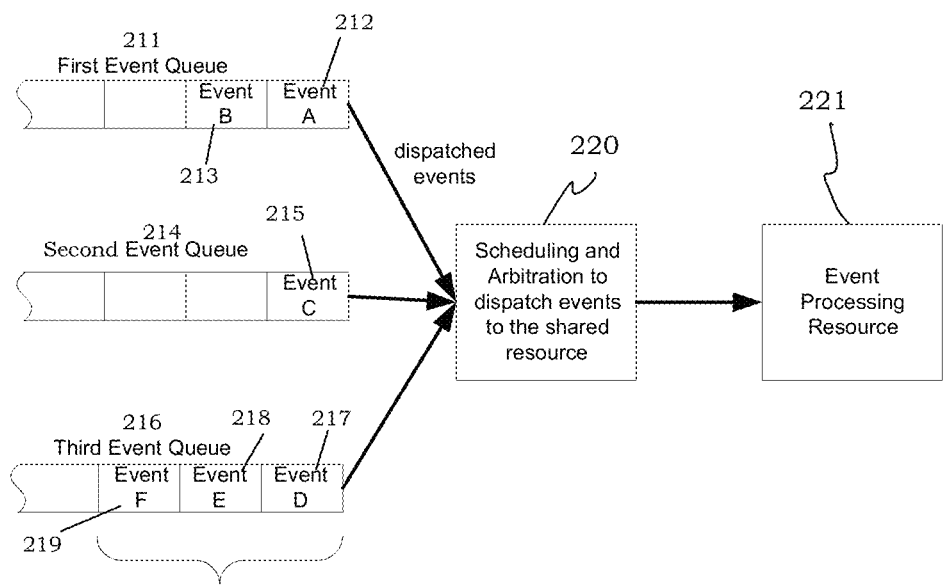
FIG. 21 is block diagram illustrating the scheduling of events residing in event queues in accordance with the present invention.

FIG. 21 is block diagram 210 illustrating the scheduling of events residing in event queues. A first event queue 211 stores an event A 212 and an event B 213, a second event queue 214 stores an event C 215, and a third event queue 216 stores an event D 217, an event E 218, an event F 219. The event D 217, the event E 218, and the event F 219 are dispatched in sequence in the third event queue 216. However, the event A 212 in the first event queue 211, the event C 215 in the second event queue 214, and the event D 217 in the third event queue 216, are dispatched in an order determined by the scheduling and arbitration block. The scheduler and arbitration block dispatches 220 events to a shared resource or an event processing resource 221.

Figure 17:
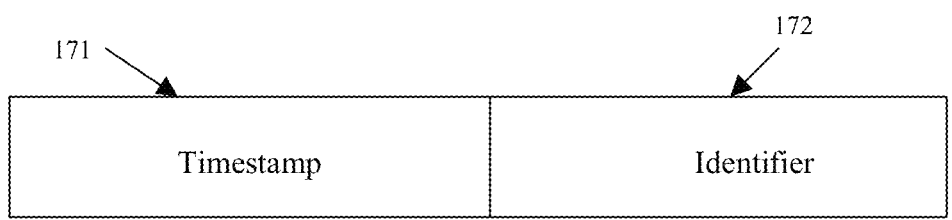
FIG. 17 is a data structure illustrating a pile node as used for scheduling and arbitration of events in accordance with the present invention.

FIG. 17 is a data structure illustrating a pile node 170 as used for scheduling and arbitration of events. In this embodiment of the invention, each node in the pile contains a value used to sequence the order of events, hereafter called a "timestamp" 171, and a unique identifier 172 used to identify the queue on which the event or action to perform resides.

To insert an event into the scheduler, a node containing the event queue identifier and the timestamp is placed at the root node, and by action of the pile sorting algorithm, the node percolates down to the proper location.

To remove an event from a pile, the identifier of the next event queue to be activated is found in the root node of the pile, and can simply be removed, leaving a hole to percolate down to the proper location.

To reschedule a queue (to remove an event from a queue and then place the next event on the queue in the pile), a new timestamp can be stored in the queue's node. The new timestamp will be used to re-sort all the queues in the pile, causing the queue's node to percolate down to the proper location.

Multiple Piles in RAM

In one embodiment of the invention, multiple schedulers can be implemented in the same memory.

Since a pile is a data structure stored in RAM, the same RAM can be used to store multiple piles, by storing multiple root nodes and their children in the same RAM. Each root node represents a unique scheduler. Since pile nodes contain links to other pile nodes, and since these nodes and links together form the pile data structure, it is easy to alter the links such that nodes are from time to time assigned to different piles (i.e., schedulers). This means that a small pool of memory resources (the pile nodes) can support a larger number of scheduler configurations than many implementations in the prior art.

In any and all embodiments of the invention, different scheduling paradigms can be implemented.

Strict Priority Scheduling

FIGS. 18A-D are data structures illustrating one embodiment of pile nodes as used for various scheduling paradigms. One such scheduling paradigm is strict priority scheduling. In strict priority scheduling, each queue of events has a different priority, and queues are activated based on the priority. The priority value of the queue is stored in the pile node, and is used as a sorting index 181.

If the queue's identifiers are chosen wisely, the priority level and the queue's identifier can be the same numerical value. This would allow each node to store only the one value 181 representing both the queue identifier and priority level, thus reducing the storage requirements of the pile.

To remove an event from the root node of the pile under the strict priority scheduling scheme, there are two distinct cases to consider. If the queue on which the event formerly resided is not empty, the queue is rescheduled (i.e. the next event on the queue is placed in the root node). The node will then percolate down to the proper location via normal pile mechanisms. If the queue on which the event formerly resided is empty, the priority value 181 is removed from the node, leaving the empty node to percolate down to the proper location.

To insert an event under the strict priority scheduling scheme, the event is given the same priority as the queue on which it resides, and the identifier for the queue along with the priority 181 are placed in a node, and the node is placed on the pile.

Round-robin Scheduling

In round-robin scheduling, there is a set of queues of events (a "round-robin set") that each must be serviced once (if the queue is not empty) before this cycle is repeated. There may be many such round-robin sets, where each set is granted service for one of its queues according to some other arbitration scheme, such as the strict priority scheme previously discussed. Piles can be used to accomplish round-robin scheduling alone or in conjunction with a other scheduling paradigms. Only the strict priority paradigm is explained below. However, combinations of round-robin with other scheduling paradigms using piles will be obvious to one versed in the art after the explanation.

A pointer is created for each round-robin set. This pointer points to the next queue to process within the round-robin set, and is adjusted according to the round-robin algorithm when the round-robin set is activated. To insert an event into a scheduler, the pointer, or some other unique representation of the round-robin set is stored in a pile node, along with the priority of the round-robin set. This pointer or other representation is stored in lieu of the queue identifier 182. The priority is placed in the pile node sort index 181.

To remove an event from the scheduler, the event in the root node of the pile is removed from the pile. The pointer, or other representation of the round-robin set in 182, is used to select the correct queue within a round robin set and to ensure that the next event selected from the set comes from the next queue, according to the round-robin algorithm.

Weighted Fair Queuing

Weighted fair queuing ensures that each event queue a minimum service rate. When a queue is removed from the scheduling process because it has no more events that require processing, the service time that was allocated to the queue is unused and is redistributed to the remaining event queues in proportion to their service rates.

In an embodiment of this invention implementing weighted fair queuing, each node in the pile contains the time at which to dispatch an event 183. By virtue of the pile sort algorithm, the smallest timestamp 183 will be present in the root node.

The removal of events under the weighted fair queuing scheme proceeds as previously indicated, with the next scheduled event present at the root node, and removal of an event at the root leaves an empty node that will percolate down to its proper location. A node is removed (or rescheduled if the Q is not empty) at every suitable opportunity, regardless of whether the current time is the same as the time in the root node.

The insertion of events under the weighted fair queuing scheme proceeds as follows:

The time required to dispatch the event must be calculated.

The time required to dispatch, and the queue identifier on which the event resides are placed in a node at the root of the pile.

By action of the pile sorting algorithm, the node is percolated down to its proper location.

The rescheduling of event queues under the weighted fair queuing scheme proceeds as follows:

The new time to dispatch the next event on same queue as was identified in the root node must be calculated or pre-calculated.

The old timestamp of the node is replaced with the new time to dispatch.

The node percolates down to the proper location as per the pile sorting algorithm.

Traffic Shaping

Under the traffic shaping algorithm, each queue is given a maximum average rate of transmission. This type of scheduling is often used for Internet routing.

To implement traffic shaping using a pile scheduler, each node in the pile is created such that it contains the next transmission time 185 for the event at the head of a queue and the queue identifier 187. The insertion, removal, and rescheduling of events proceeds as in the previously described embodiments of the invention, with the timestamp 187 representing the next transmission time for the queue in the node. However, the event on the root node cannot be removed or rescheduled until its next transmission time 185, which is greater than or equal to the current real-world time.

In the case that there are two pile nodes (i.e. events) with the same timestamp value 187, a priority field 186, placed in the least significant part of a node's sort index, may be used to determine the event to process.

Combination of Scheduling Paradigms

Figure 18A:
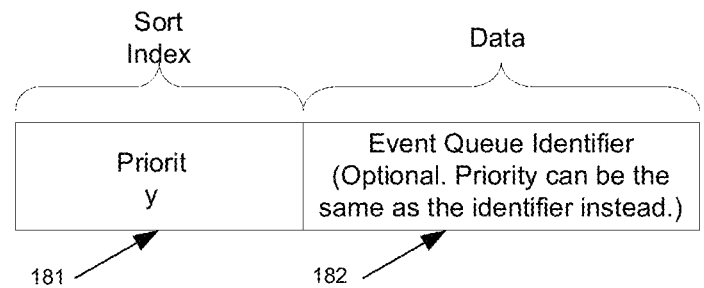
FIGS. 18A-D are data structures illustrating one embodiment of pile nodes as used for various scheduling paradigms in accordance with the present invention.
Figure 18B:
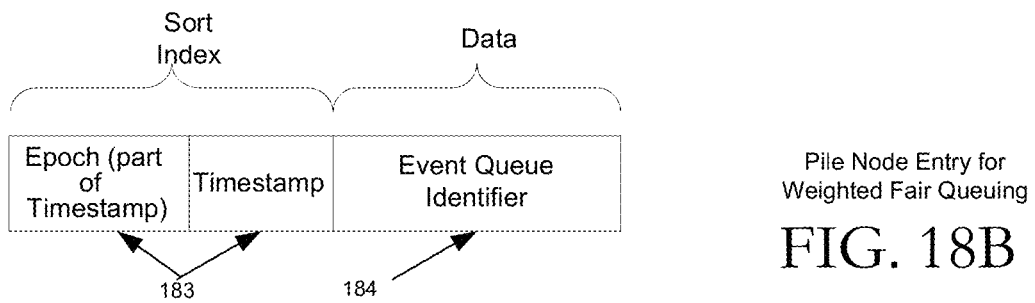
Figure 18C:
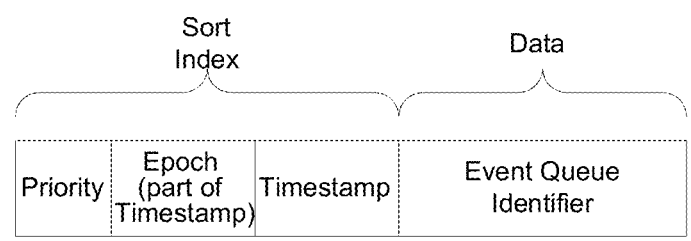

Under one embodiment of the invention, scheduling algorithms are combined to implement the strict priority service of several queues, with the unused service time being consumed by weighted fair queuing on remaining queues, as shown in FIG. 18C.

Under the combined strict priority and weighted fair queuing scheme, node sort indices are created such that each sort index contains the queue priority and a timestamp. The priority field is placed in the most significant bit position of the sort index, and will therefore be the dominant factor in the pile sorting algorithm. However, the priority field is only applicable to queues that adhere to the strict priority scheduling scheme, while the timestamp applies to queues that adhere to the weighted fair queuing scheduling scheme. To accomplish this, the lowest priority value is used only by queues that adhere to the waited fair queuing (WFQ) scheduling scheme.

Under another embodiment of the invention, scheduling algorithms are combined to implement the strict priority service of several queues, with traffic shaping on the remaining queues.

Figure 15:
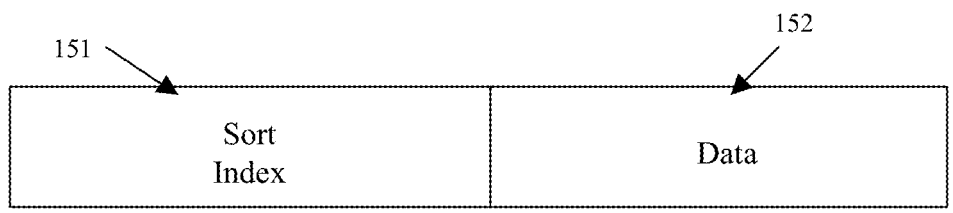
FIG. 15 is a data structure illustrating one embodiment of a pile node in accordance with the present invention.
Figure 18D:
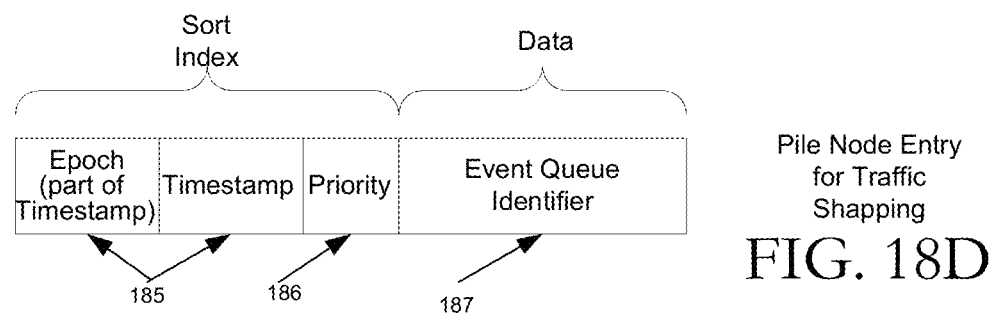

Under the combined strict priority and traffic shaping scheme, nodes are created such that each node sort index contains the queue timestamp, followed by the queue priority field in the least significant position. The queue ID is present in the data field of the node, as shown in FIG. 15. The timestamp and priority are placed in the sort index part of the node, as shown in FIG. 18D.

The value of the priority field for the queues adhering to the strict priority scheduling paradigm are required to be of higher value than the priority values for queues adhering to the traffic shaping paradigm. Therefore, by virtue of the pile sorting algorithm, the queues adhering to the strict priority service paradigm are serviced before any of the shaped queues.

Under another embodiment of the invention, scheduling algorithms are combined to implement traffic shaping on several queues, with idle bandwidth consumed by weighted fair queuing on remaining queues.

Under the combined traffic shaping and weighted fair queuing scheme, two separate piles are created: a weighted fair queuing pile and a traffic shaping pile. Arbitration is devised such that priority is always given to the traffic shaping pile. Since traffic shaped queues are serviced only at particular times, the idle time can be used to service queues in the weighted fair queuing pile.

Under another embodiment of the invention, scheduling algorithms are combined to implement strict priority service of several queues, with traffic shaping on several other queues, with the idle bandwidth consumed by weighted fair queuing on remaining queues.

Under the combined strict priority, traffic shaping and weighted fair queuing scheme, two separate piles are created: a combined strict priority and traffic shaping pile (as previously described) and a weighted fair queuing pile. Arbitration is devised such that priority is always given to the strict priority and traffic shaping pile. Since strict priority and traffic shaped queues are serviced only at particular times, the idle time can be used to service queues in the weighted fair queuing pile.

Preventing Time Stamp Rollover

Under any scheduling paradigm, there is always the possibility that the required sort index no longer fits in the sort index field 151, after being incremented, creating an overflow situation. In scheduling, the index is the timestamp. Since a timestamp always increases, and since a finite number of bits (or digits) are used to represent the timestamp, there comes a point when the timestamp "overflows". In other words, the timestamp can no longer fit in the allocated number of bits (or digits), so the most significant bit (or digit) of the actual true timestamp value is discarded. Thus the value of the timestamp field appears significantly smaller than the actual value assigned to the event, causing the event to be incorrectly scheduled. Any embodiment of the invention can implement the following timestamp overflow prevention measures.

When the maximum possible timestamp value is known, the timestamp field can simply be chosen to be large enough to avoid the case of a timestamp overflow.

However, if the maximum possible timestamp value is not available, or is simply too large to be practically stored in memory, an additional 1-bit field, herein called the "epoch bit," can be appended to the timestamp, and can be used to detect timestamp rollover conditions. The epoch bit is in the most significant bit place of the timestamp. The interpretation of the magnitude of the value of the epoch bit alternates over time as the timestamp rolls over:

1>0 or 0>1 alternating after every rollover ("alternating greatness")

This alternating greatness is controlled by a single "epoch state bit" that indicates the current epoch of the current time. I.e., when the time itself overflows and causes the upper bit to be discarded, the epoch state bit is set to 1. When time once again overflows, the epoch state bit is set to 0. This cycle then repeats. Optionally, the most significant bit in the current time can serve as the epoch bit.

Figure 19:
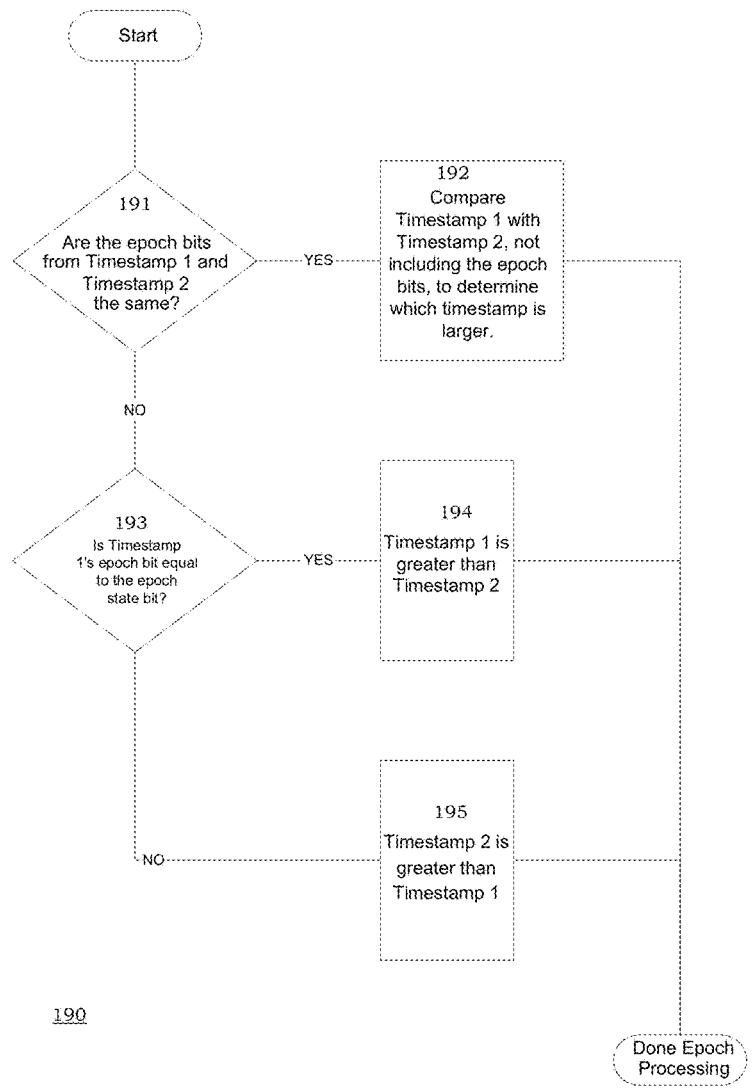
FIG. 19 is a flow chart illustrating the process for executing an alternating greatness with an epoch state bit in accordance with the present invention.
Figure 20:
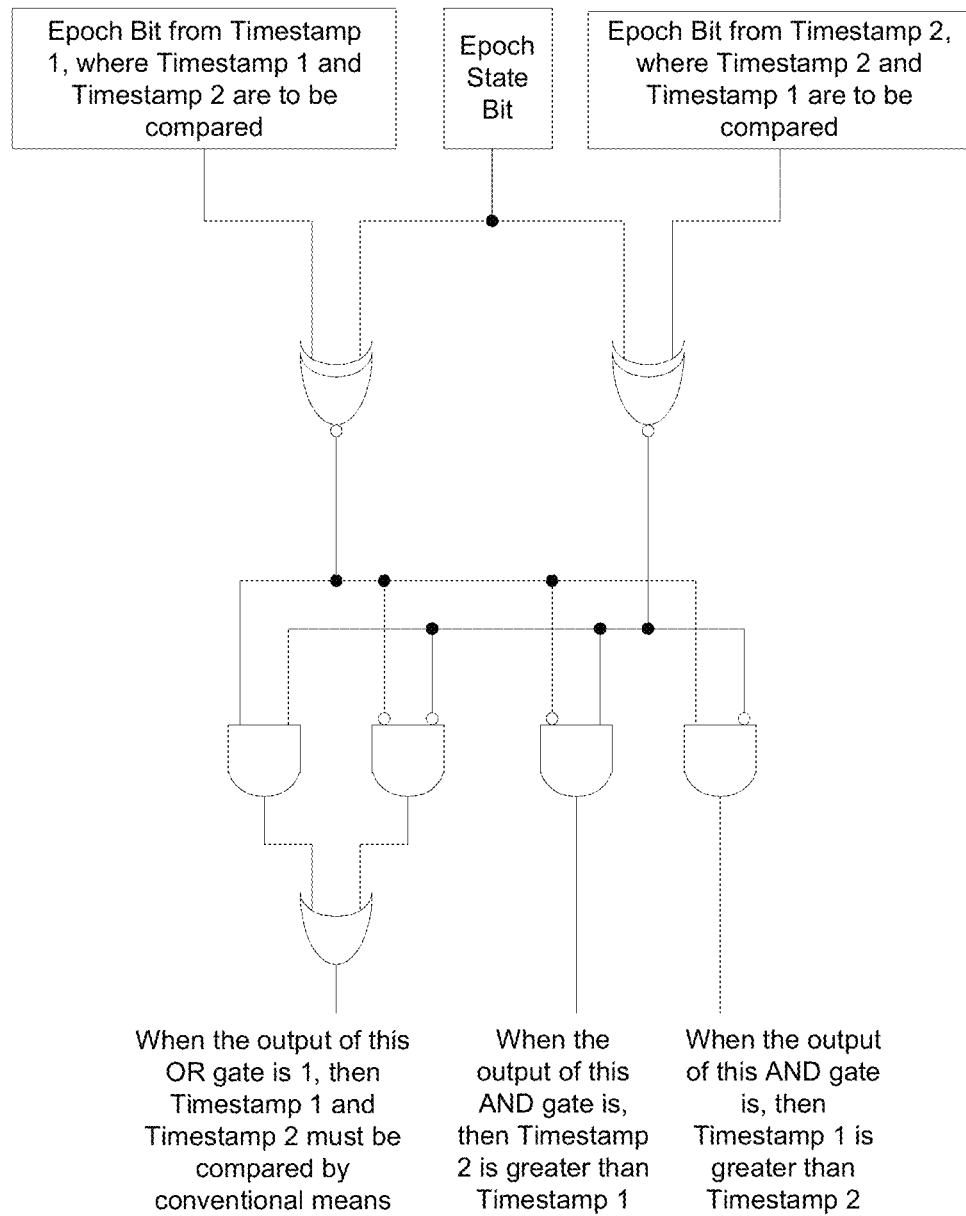
FIG. 20 is logic diagram illustrating the logical operations for executing an alternating greatness with an epoch state bit in accordance with the present invention.

The alternating greatness is described by the following algorithm, also shown in a process 190 in FIG. 19. A sample circuit implementation is shown in FIG. 200. The term "timestamp 1" is referenced as "Timestamp A", and the "timestamp 2" is referenced as "Timestamp B" in FIG. 19.

At step 191, if the epoch bits in timestamp 1 and timestamp 2 are the same:
  At step 192, compare only the portions of timestamp 1 and timestamp 2 that do not contain the epoch bit.
  Stop.
  At steps 193, 194, and 195, the following operations occur.
Otherwise, if the epoch state bit is 0:
  The timestamp with an epoch bit of 1 is considered smaller than the other timestamp.
  Stop.
Otherwise, the epoch state bit is 1
  The timestamp with an epoch bit of 0 is considered smaller than the other timestamp.
  Stop.

This scheme works when the period of the timer rollover is two times that of the longest scheduling interval between events on the same queue.

The patent disclosure includes copyrightable material. The copyright owner gives permission for facsimile reproduction of material in Patent Office files, but reserves all other copyright rights whatsoever.

Foregoing described embodiments of the invention are provided as illustrations and descriptions. They are not intended to limit the invention to precise form described. In particular, Applicants contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. A method for ensuring weighted fair queuing in a heap-like tree structure, comprising:
  allocating a first service time duration to a first event queue in a heap-like tree structure comprising nodes, the first event queue having a first event;
  allocating a second service time duration to a second event queue in the heap-like tree structure, the second event queue having a second event, wherein the heap-like tree structure has a plurality of event queues including the first and second event queues;
  if no more events are present in the first event queue, comprising:
    removing a first event queue identifier from processing by a scheduling process; and
    automatically redistributing the first service time duration within the heap-like tree structure wherein the redistributing of the first service time duration comprises redistributing based on weighted queuing the first service time duration to remaining event queues in the heap-like tree structure proportional to a service rate associated with the second queue and other queues excluding the first queue; and
  if no more events are present in the second event queue, comprising:
    removing a second event queue identifier from processing by the scheduling process; and automatically redistributing the second service time duration within the heap-like tree structure, wherein at least one operation of the method is executed through a processor.

2. The method of claim 1, wherein the redistributing of the second service time duration comprises redistributing the second service time duration to remaining event queues in the heap-like tree structure proportional to a service rate associated with the first queue and other queues excluding the second queue.

3. The method of claim 1, further comprising removing an event from a root node if the first queue in the first event is not empty by rescheduling the event, and percolating a node corresponding to the event down to a location in the heap-like tree structure.

4. The method of claim 1, further comprising removing an event from a root node if the first queue in the first event is empty by removing a first priority of the first event in the first queue; and leaving an empty node in the first queue to percolate down the heap-like structure.

5. The method of claim 1, further comprising inserting an event in a pile including:
computing a time required to dispatch an event;
placing a queue identifier of the event, and the time to dispatch the event, in a root node of the heap-like tree structure; and
percolating the node down in the pile.

6. The method of claim 5, wherein a smallest time stamp is placed in the root node.

7. The method of claim 1, further comprising rescheduling an event queue including:
computing a time required to dispatch a next event in a same queue;
replacing an old timestamp associated with the event with a new timestamp; and
percolating a node down the heap-like tree structure.

8. A tangible, non-transitory, computer-readable media having instructions thereupon which, when executed by a processor, cause the processor to perform a method comprising:
allocating a first service time duration to a first event queue in a heap-like tree structure comprising nodes, the first event queue having a first event;
allocating a second service time duration to a second event queue in the heap-like tree structure, the second event queue having a second event, wherein the heap-like tree structure has a plurality of event queues including the first and second event queues;
if no more events are present in the first event queue, comprising:
removing a first event queue identifier from processing by a scheduling process; and
automatically redistributing the first service time duration within the heap-like tree structure wherein the redistributing of the first service time duration comprises redistributing based on weighted queuing the first service time duration to remaining event queues in the heap-like tree structure proportional to a service rate associated with the second queue and other queues excluding the first queue; and
if no more events are present in the second event queue, comprising:
removing a second event queue identifier from processing by the scheduling process; and
automatically redistributing the second service time duration within the heap-like tree structure, wherein at least one operation of the method is executed through a processor.

9. The computer readable media of claim 8, wherein the redistributing of the second service time duration comprises redistributing the second service time duration to remaining event queues in the heap-like tree structure proportional to a service rate associated with the first queue and other queues excluding the second queue.

10. The computer readable media of claim 8, wherein the method further comprises removing an event from a root node if the first queue in the first event is not empty by rescheduling the event, and percolating a node corresponding to the event down to a location in the heap-like tree structure.

11. The computer readable media of claim 8, wherein the method further comprises removing an event from a root node if the first queue in the first event is empty by removing a first priority of the first event in the first queue; and leaving an empty node in the first queue to percolate down the heap-like structure.

12. The computer readable media of claim 8, wherein the method further comprises inserting an event in a pile including:
computing a time required to dispatch an event;
placing a queue identifier of the event, and the time to dispatch the event, in a root node of the heap-like tree structure; and
percolating the node down in the pile.

13. The computer readable media of claim 12, wherein a smallest time stamp is placed in the root node.

14. The computer readable media of claim 8, wherein the method further comprises rescheduling an event queue including:
computing a time required to dispatch a next event in a same queue;
replacing an old timestamp associated with the event with a new timestamp; and
percolating a node down the heap-like tree structure.

* * * * *